(12) United States Patent
Fukuyama

(10) Patent No.: US 8,994,787 B2
(45) Date of Patent: Mar. 31, 2015

(54) VIDEO SIGNAL PROCESSING DEVICE AND VIDEO SIGNAL PROCESSING METHOD

(75) Inventor: Masayuki Fukuyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 472 days.

(21) Appl. No.: 13/472,656

(22) Filed: May 16, 2012

(65) Prior Publication Data
US 2012/0229599 A1 Sep. 13, 2012

Related U.S. Application Data

(63) Continuation of application No. PCT/JP2010/004191, filed on Jun. 24, 2010.

(30) Foreign Application Priority Data

Nov. 27, 2009 (JP) .................................. 2009-269556

(51) Int. Cl.
*H04N 13/00* (2006.01)

(52) U.S. Cl.
CPC ......... *H04N 13/0011* (2013.01); *H04N 13/004* (2013.01); *H04N 13/007* (2013.01)
USPC ........................................................ 348/42

(58) Field of Classification Search
CPC H04N 13/007; H04N 13/0011; H04N 13/004
USPC .............................. 348/42, E13.002, E13.001
See application file for complete search history.

(56) References Cited

U.S. PATENT DOCUMENTS 5,982,375 A * 11/1999 Nelson et al. ................. 345/419
7,768,564 B2    8/2010 Miura
(Continued)

FOREIGN PATENT DOCUMENTS

CN   1697490   11/2005
JP   01-093986   4/1989
(Continued)

OTHER PUBLICATIONS

An Office Action issued Apr. 15, 2014 in counterpart Chinese Patent Application No. 201080053237.6 (with English translation).
International Search Report issued Sep. 14, 2010 in International (PCT) Application No. PCT/JP2010/004191.

*Primary Examiner* — Mehrdad Dastouri
*Assistant Examiner* — Mohammed Rahaman
(74) *Attorney, Agent, or Firm* — Wenderoth, Lind & Ponack, L.L.P.

(57) ABSTRACT

A video signal processing device processes a 3D video signal including a left-eye image and a right-eye image. The video signal processing device includes an OSD control unit generating a left-eye superimposition image and a right-eye superimposition image, an OSD superimposing unit superimposing the left-eye superimposition image on the left-eye image and the right-eye superimposition image on the right-eye image, so as to generate an output image, and a video output unit providing the output image. The OSD control unit includes a first register holding a left-eye parameter for generating the left-eye superimposition image, and a second register holding a right-eye parameter for generating the right-eye superimposition image. The OSD control unit generates the left-eye superimposition image and the right-eye superimposition image by shifting positions of pixels in a predetermined image based on the left-eye parameter and the right-eye parameter.

5 Claims, 12 Drawing Sheets

(56) References Cited

U.S. PATENT DOCUMENTS

| | | |
|---|---|---|
| 8,553,127 B2 | 10/2013 | Miura |
| 2005/0253950 A1 | 11/2005 | Miura |
| 2009/0142041 A1* | 6/2009 | Nagasawa et al. ............ 386/124 |
| 2009/0220213 A1* | 9/2009 | Ogawa et al. .................. 386/95 |
| 2009/0315979 A1* | 12/2009 | Jung et al. ...................... 348/43 |
| 2010/0021141 A1 | 1/2010 | Yamashita et al. |
| 2010/0118119 A1 | 5/2010 | Newton et al. |
| 2010/0220175 A1* | 9/2010 | Claydon et al. ................ 348/43 |
| 2010/0277645 A1 | 11/2010 | Miura |
| 2012/0020640 A1 | 1/2012 | Uchimura |
| 2012/0315022 A1 | 12/2012 | Nagasawa et al. |

FOREIGN PATENT DOCUMENTS

| | | |
|---|---|---|
| JP | 4-241593 | 8/1992 |
| JP | 8-079802 | 3/1996 |
| JP | 10-234058 | 9/1998 |
| JP | 2009-135686 | 6/2009 |
| JP | 2010-268431 | 11/2010 |
| WO | 2008/044191 | 4/2008 |
| WO | 2009/090868 | 7/2009 |
| WO | 2010/010709 | 1/2010 |

* cited by examiner

VIDEO SIGNAL PROCESSING DEVICE AND VIDEO SIGNAL PROCESSING METHOD

CROSS REFERENCE TO RELATED APPLICATION

This is a continuation application of PCT Patent Application No. PCT/JP2010/004191 filed on Jun. 24, 2010 designating the United States of America, which is based on and claims priority of Japanese Patent Application No. 2009-269556 filed on Nov. 27, 2009. The entire inventions of the above-identified applications, including the specifications, drawings and claims are incorporated herein by reference in their entirety.

TECHNICAL FIELD

The present invention relates to video signal processing devices and, in particular, to a video signal processing device for processing three-dimensional (3D) video signals.

BACKGROUND ART

There are conventional video signal processing devices processing 3D video signals each including left-eye images and right-eye images in order to show a 3D video which can convey a stereoscopic perception to the viewer (See Patent Reference 1). A left-eye image and a right-eye image have parallax, and are, for example, generated by two cameras each located at a different place.

The video signal processing devices, for example, convert the format of provided 3D video signals. The format conversion includes, for example, frame rate conversion, image size conversion, and scanning technique conversion. The video signal devices provide the format-converted 3D video signals to a 3D video displaying device.

The 3D video displaying device displays left-eye images and right-eye images according to a predetermined system to provide a 3D video which conveys a stereoscopic perception to the viewer. For example, the 3D video displaying device alternately displays a left-eye image and a right-eye image for each frame.

CITATION LIST

Patent Literature

Patent Reference 1: Japanese Unexamined Patent Application Publication No. 04-241593

SUMMARY OF INVENTION

Technical Problem

Unfortunately, the above conventional technique has a difficulty in utilizing a circuit used for the conventional video signal processing devices, which results in cost increases.

A single 3D image includes two two-dimensional images; namely, a left-eye image and a right-eye image. In other words, when a 3D video is to be provided while maintaining the same video quality as that of a conventional two-dimensional (2D) video, the images need to be displayed at the frame rate of twice as high (for example, 120 fps) as that (for example, 60 fps) of the 2D video.

Consequently, the 3D video signal processing device has to have a high-performance image processing circuit which should be capable of processing images at, for example, twice the frame rate of the conventional 2D video. Such a high-performance image processing circuit inevitably causes a cost increase and requires a significant change of the circuit in the conventional video signal processing device.

The present invention is conceived in view of the above problems and has an object to provide a video signal processing device which utilizes a circuit of a conventional video signal processing device as much as possible to reduce a cost increase, and a video signal processing method for the video signal processing device.

Solution to Problem

In order to achieve the above object, a video signal processing device according to an aspect of the present invention processes a 3D video signal including a left-eye image and a right-eye image. The video signal processing device includes: an on-screen display (OSD) control unit which generates a left-eye superimposition image and a right-eye superimposition image; a superimposing unit which superimposes the left-eye superimposition image on the left-eye image and the right-eye superimposition image on the right-eye image, so as to generate an output image; and a video output unit which provides the output image, wherein the OSD control unit includes: a first register which holds a left-eye parameter for generating the left-eye superimposition image; and a second register which holds a right-eye parameter for generating the right-eye superimposition image, and the OSD control unit which generates the left-eye superimposition image and the right-eye superimposition image, by shifting positions of pixels in a predetermined image based on the left-eye parameter and the right-eye parameter.

This structure utilizes a circuit of a conventional video signal processing device as much as possible. Consequently, such a feature makes it possible to reduce the cost increase of the video signal processing device according to the aspect of the present invention and process 3D video signals.

The 3D video signal may include the left-eye image and the right-eye image using a frame sequential technique, and the OSD control unit includes an OSD processing unit may sequentially generate the left-eye superimposition image and the right-eye superimposition image, by switching between the first register and the second register.

This feature allows one OSD processing unit to sequentially switch two registers for use. Thus, the one OSD processing unit successfully generates the left-eye superimposition image and the right-eye superimposition image. Consequently, the video signal processing device is provided with a simpler circuit structure, which contributes to reduction in the cost increase.

The video signal processing device may further include a synchronous signal generating unit which generates a synchronous signal indicating a separation between pictures each including the left-eye image and the right-eye image, wherein by switching between the first register and the second register based on the synchronous signal, the OSD processing unit may (i) obtain the left-eye parameter from said first register so that the synchronous signal and the left-eye image synchronize with each other, and generate the left-eye superimposition image based on the obtained left-eye parameter and (ii) obtain the right-eye parameter from said second register so that the synchronous signal and the right-eye image synchronize with each other, and generate the right-eye superimposition image based on the obtained right-eye parameter.

This feature makes it possible to synchronize (i) the left-eye image and the left-eye superimposition image and (ii) the right-eye image and the right-eye superimposition image, and process the synchronized images.

The 3D video signal may include the left-eye image and the right-eye image using a line-sequential technique. The 3D video signal processing device may further include: a synchronous signal generating unit which generates (i) a first synchronous signal indicating both a separation for a line of the left-eye image and a separation for a line of the right-eye image and (ii) a second synchronous signal indicating either a separation for a line of the left-eye image or a separation for a line of the right-eye image; and a synthesizing unit which synthesizes the left-eye image and the right-eye image based on the second synchronous signal so as to generate a synthesized image. The OSD control unit may include: a first OSD processing unit which obtains the left-eye parameter from the first register, and generates the left-eye superimposition image based on the obtained left-eye parameter; and a second OSD processing unit which obtains the right-eye parameter from the second register, and generates the right-eye superimposition image based on the obtained right-eye parameter. Based on the second synchronous signal, the superimposing unit may superimpose the left-eye superimposition image and the right-eye superimposition image on the synthesized image. The video output unit may provide the output image based on the first synchronous signal.

This feature allows the two OSD processing units to obtain a parameter from a register corresponding one of the OSD processing units, and generates the left-eye superimposition image and the right-eye superimposition image. Here, the superimposing unit uses the second synchronous signal in order not to identify a separation between the left-eye image and the right-eye image. Thus, the superimposing unit processes the left-eye image and the right-eye image as a one-2D image. This feature makes it possible to utilize an OSD processing unit included in a conventional video signal processing device without modification, which contributes to the cost reduction.

The first OSD processing unit may further (i) generate in a right-eye image area a right-eye transparent image through which an image-to-be superimposed passes and (ii) provide, based on the second synchronous signal, the left-eye superimposition image and the right-eye transparent image as a one-frame image. The second OSD processing unit may further (i) generate in a left-eye image area a left-eye transparent image through which an image-to-be-superimposed passes and (ii) provide, based on the second synchronous signal, the right-eye superimposition image and the left-eye transparent image as a one-frame image. Based on the second synchronous signal, the superimposing unit may superimpose on the synthesized image (i) the left-eye superimposition image and the right-eye transparent image and (ii) the right-eye superimposition image and the left-eye transparent image, so as to generate the output image.

This feature allows a transparent image to be superimposed on the right-eye image when the left-eye superimposition image is superimposed on the left-eye image, which contributes to the prevention of deterioration in the picture quality of the right-eye image. Similarly, this feature allows a transparent image to be superimposed on the left-eye image when the right-eye superimposition image is superimposed on the right-eye image, which contributes to the prevention of deterioration in the picture quality of the left-eye image.

The video signal processing device may process the 3D video signal and a two-dimensional (2D) video signal including a 2D image. The first register may further hold a 2D parameter indicating a position of a predetermined image to be displayed. The OSD control unit may control the position of the predetermined image to be displayed, based on the 2D parameter, so as to generate a 2D superimposition image. The superimposing unit may further superimpose the 2D superimposition image on the 2D image.

The left-eye superimposition image and the right-eye superimposition image may be subtitles or a menu image.

Instead of being implemented as the video signal processing device, the present invention may also be implemented as a method including the processing units included in the video signal processing device as steps. The present invention may be implemented as a program which causes a computer to execute such steps. Moreover, the present invention may be implemented as a storage medium such as a computer-readable Compact Disc-Read Only Memory (CD-ROM) which stores the program, and information, data or a signal showing the program. Such a program, information, data, and signal may be distributed via a communications network such as the Internet.

Part or all of the constituent elements constituting each of the devices may be configured from a single System-LSI (Large-Scale Integration). The System-LSI is a super-mufti-function LSI manufactured by integrating constituent units on one chip, and is specifically a computer system configured by including a microprocessor, Read-Only Memory (ROM), Random Access Memory (RAM), or by means of a similar device Advantageous Effects of Invention A video signal processing device and a video signal processing method according to an implementation of the present invention successfully provides a video signal processing device which utilizes a circuit of a conventional video signal processing device as much as possible to reduce a cost increase.

BRIEF DESCRIPTION OF DRAWINGS

These and other objects, advantages, and features of the invention will become apparent from the following description thereof taken in conjunction with the accompanying drawings that illustrate a specific embodiment of the present invention. In the Drawings.

DESCRIPTION OF EMBODIMENTS

Detailed hereinafter based on embodiments are a video signal processing device and a video signal processing method according to an implementation of the present invention, with reference to the drawings.

Embodiment 1

The video signal processing device according to Embodiment 1 processes a 3D video signal including a left-eye image and a right-eye image, using a frame-sequential technique. The video signal processing device features to include: an OSD control unit which generates a left-eye superimposition image and a right-eye superimposition image; and a superimposing unit which respectively superimposes the generated left-eye superimposition image and the generated right-eye superimposition image on a left-eye image and a right-eye image. Specifically, the OSD control unit includes: a first register which holds a left-eye parameter for generating the left-eye superimposition image; a second register which holds a right-eye parameter for generating the right-eye superimposition image; and an OSD processing unit which switches between the first register and the second register, and generates the left-eye superimposition image and the right-eye superimposition image.

Described first is a structure of a video signal processing system including the video signal processing device according to Embodiment 1.

Figure 1:
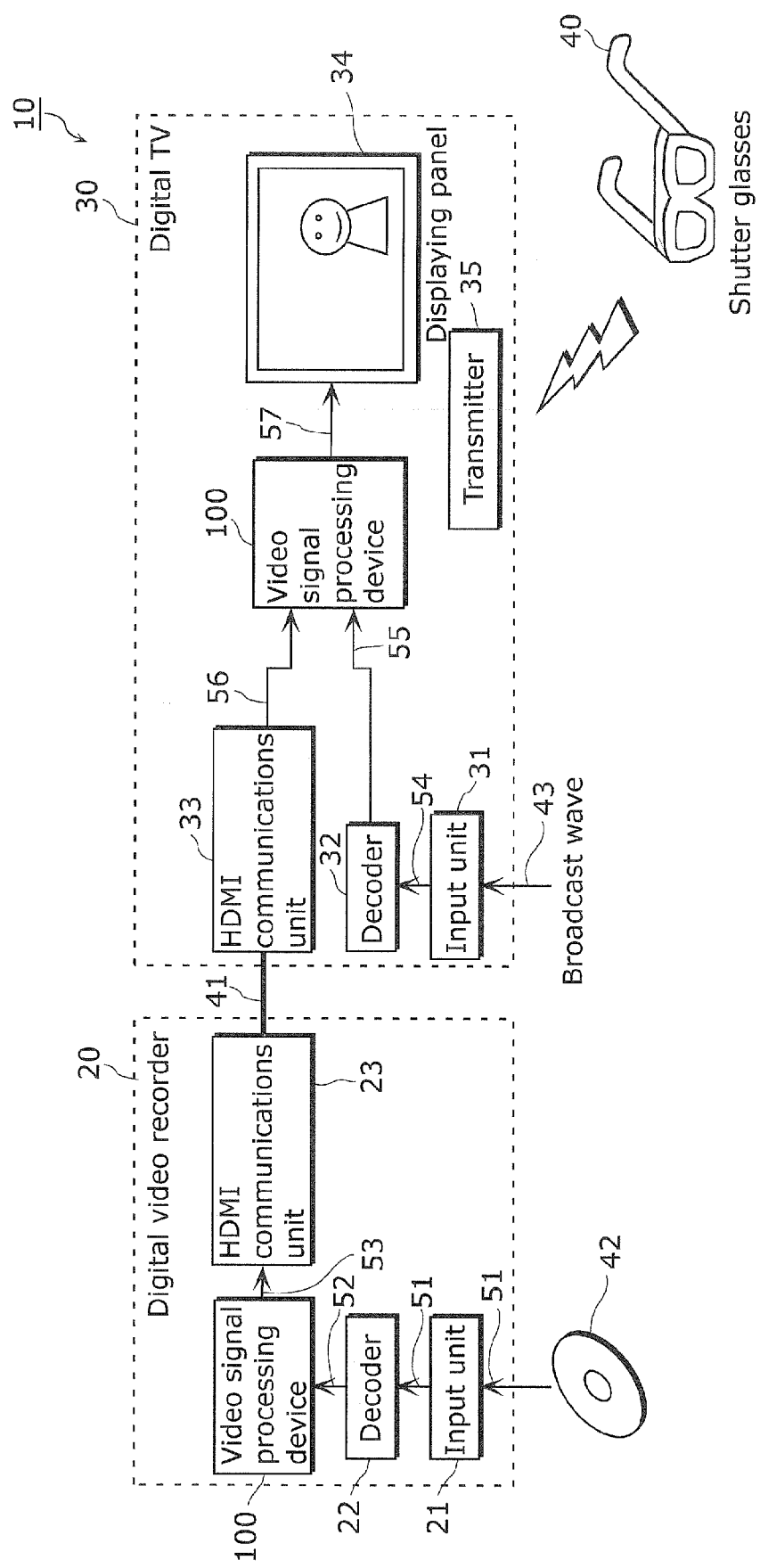
FIG. 1 depicts a block diagram showing a structure of a video signal processing system including a video signal processing device according to Embodiment 1.

FIG. 1 depicts a block diagram showing a structure of a video signal processing system 10 including a video signal processing device 100 according to Embodiment 1.

The video signal processing system 10 in FIG. 1 includes a digital video recorder 20, a digital TV 30, and shutter glasses 40. Furthermore, the digital video recorder 20 and the digital TV 30 are connected with each other via a High Definition Multimedia Interface (HDMI) cable 41.

The digital video recorder 20 is an example of a video signal recording and reproducing device. The digital video recorder 20 converts the format of 3D video signals stored in a storage medium 42, and provides the converted 3D video signals to the digital TV 30 via the HDMI cable 41. It is noted that the format conversion includes, for example, frame rate conversion, image size conversion, and scanning technique conversion.

Moreover, the storage medium 42 includes optical discs such as a Blu-ray Disc (BD), magnetic disks such as a Hard Disk Drive (HDD), and non-volatile memory.

The digital TV 30 is an example of a video displaying device. The digital TV 30 converts the format of the 3D video signals inputted from the digital video recorder 20 via the HDMI cable 41 or the format of the 3D video signals included in a broadcast wave 43. Then, the digital TV 30 displays a 3D video included in the converted 3D video signals. It is noted that the broadcast wave 43 includes, for example, digital terrestrial television and satellite digital television.

The shutter glasses 40 are worn by a viewer to watch the 3D video. The shutter glasses 40 are, for example, liquid crystal shutter glasses. The shutter glasses 40 include a left-eye liquid crystal shutter and a right-eye liquid crystal shutter. The shutter glasses 40 synchronize with the video displayed by the digital TV 30 to cause the shutters to open and close.

It is noted that the digital video recorder 20 may convert the format of 3D video signals included in the broadcast wave 43 or the format of 3D video signals obtained via a communications network such as the Internet. Moreover, the digital video recorder 20 may convert the format of 3D video signals provided from an external device via an external input (not shown).

Similarly, the digital TV 30 may convert the format of 3D video signals stored in the storage medium 42. Moreover, the digital TV 30 may convert the format of 3D video signals provided from an external device, other than the digital video recorder 20, via an external input (not shown).

In addition, the digital video recorder 20 and the digital TV 30 may be connected with each other via a cable whose standard is different from that of the HDMI cable 41 or via a wireless communications network.

Hereinafter, the structures of the digital video recorder 20 and the digital TV 30 are described in details. Described first is the digital video recorder 20.

As shown in FIG. 1, the digital video recorder 20 includes an input unit 21, a decoder 22, the video signal processing device 100 and an HDMI communications unit 23.

The input unit 21 obtains a 3D video signal 51 stored in the storage medium 42. The 3D video signal 51 includes, for example, a compression-coded 3D video according to a standard such as MPEG-4 AVC/H.264.

The decoder 22 decodes the 3D video signal 51 obtained by the input unit 21 to generate an input 3D video signal 52.

The video signal processing device 100 processes the input 3D video signal 52 generated by the decoder 22 to generate an output 3D video signal 53. The detailed structure and an operation of the video signal processing device 100 shall be described later.

The HDMI communications unit 23 provides, to the digital TV 30 via the HDMI cable 41, the output 3D video signal 53 generated by the video signal processing device 100.

It is noted that the digital video recorder 20 may store the generated output 3D video signal 53 into a storage unit (such as an HDD and non-volatile memory) included in the digital video recorder 20 itself. The digital video recorder 20 may also store the output 3D video signal 53 into a removable storage medium (such as an optical disc).

In the case where the digital video recorder 20 is connected to the digital TV 30 with a measure other than the HDMI cable 41, the digital video recorder 20 may include, instead of the HDMI communications unit 23, a communications unit which matches the measure. For example, the digital video recorder 20 may include a wireless communications unit when the connecting measure is a wireless communications network. When the connecting measure is a cable which complies with another standard, the digital video recorder 20 may include a communications unit which matches the standard. It is noted that the digital video recorder 20 may include two or more of these communications units, and switch therebetween for use.

Described next is the digital TV 30.

As shown in FIG. 1, the digital TV 30 includes an input unit 31, a decoder 32, an HDMI communications unit 33, the video signal processing device 100, a displaying panel 34, and a transmitter 35.

The input unit 31 obtains a 3D video signal 54 included in the broadcast wave 43. The 3D video signal 54 includes a compression-coded 3D video according to a standard such as, for example, MPEG-4 AVC/H.264.

The decoder 32 decodes the 3D video signal 54 obtained by the input unit 31 to generate an input 3D video signal 55.

The HDMI communications unit 33 obtains the output 3D video signal 53 provided from the HDMI communications unit 23 included in the digital video recorder 20, and forwards the output 3D video signal 53 to the video signal processing device 100 as an input 3D video signal 56.

The video signal processing device 100 processes the input 3D video signals 55 and 56 to generate an output 3D video signal 57. The detailed structure and an operation of the video signal processing device 100 shall be described later.

The displaying panel 34 displays a 3D video included in the output 3D video signal 57. The 3D video includes a left-eye image and a right-eye image having parallax. Since the left-eye image and the right-eye image are respectively and selectively projected onto the left eye and the right eye of the viewer, the viewer can receive a stereoscopic perception from the video.

The transmitter 35 causes the shutters of the shutter glasses 40 to open and close via wireless communications. For example, when the left-eye image and the right-eye image are alternatively displayed on the displaying panel 34 for each picture, the transmitter 35 opens the left-eye liquid crystal shutter of the shutter glasses 40 while the left-eye image is displayed on the displaying panel 34, and closes the right-eye liquid crystal shutter. This operation allows the left-eye image to be projected only onto the left eye of the viewer. In addition, the transmitter 35 opens the right-eye liquid crystal shutter of the shutter glasses 40 while the right-eye image is displayed on the displaying panel 34, and closes the left-eye liquid crystal shutter. This operation allows the right-eye image to be projected only onto the right eye of the viewer.

It is to be noted that the technique to selectively project the images onto the left eye and the right eye of the viewer shall not be defined only by the above technique. For example, the displaying panel 34 may differently polarize the left-eye image and the right-eye image with each other, and the viewer may wear polarized glasses equipped with a left-eye filter and a right-eye filter each dealing with the corresponding polarization.

In the case where the digital TV 30 is connected to the digital video recorder 20 with a measure other than the HDMI cable 41, as seen in the case of the digital video recorder 20, the digital TV 30 may include, instead of the HDMI communications unit 33, a communications unit which corresponds to the measure.

Figure 2:
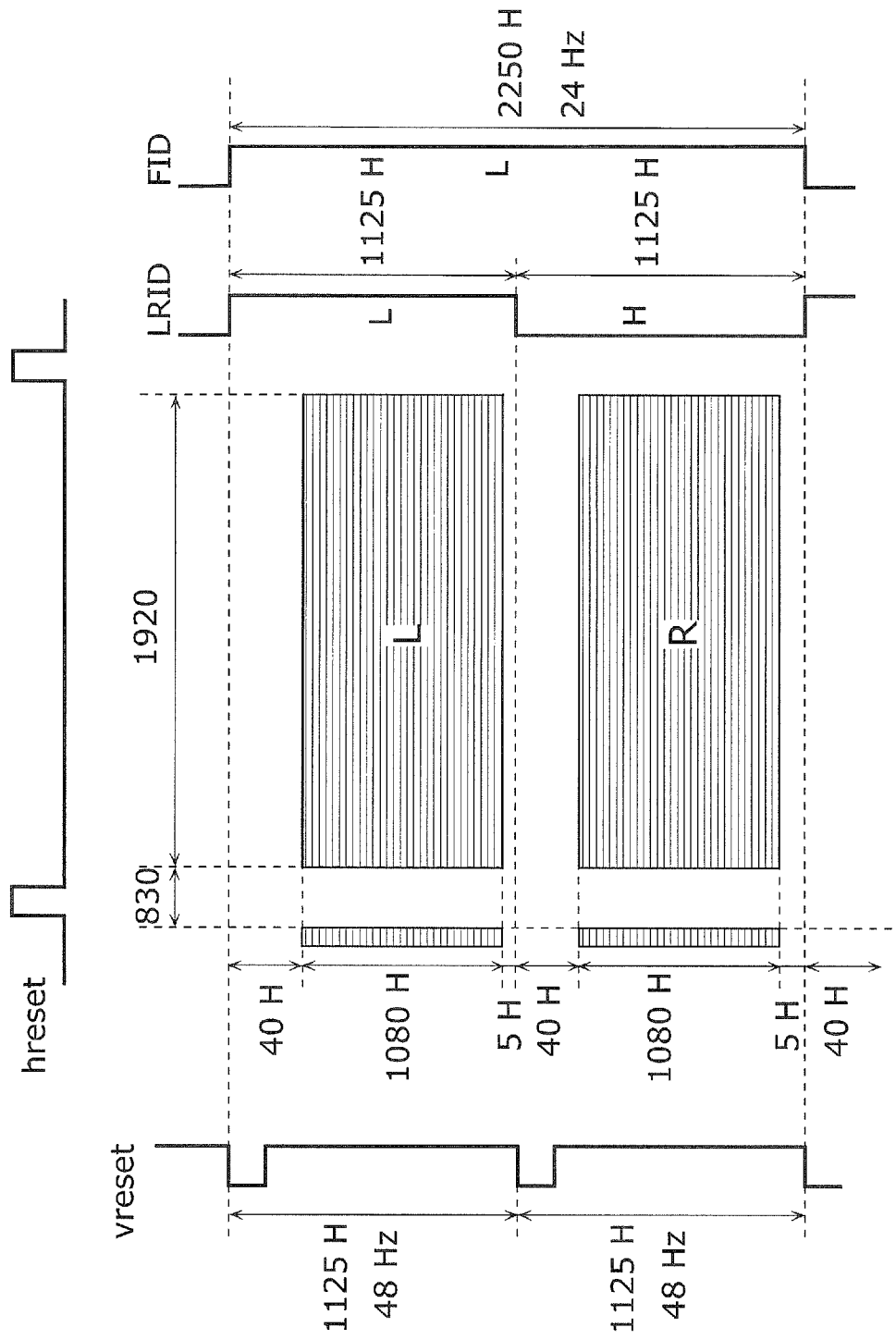
FIG. 2 exemplifies a frame-sequential 3D video signal.

Described next is an example of a 3D video signal which the video signal processing device 100 according to Embodiment 1 processes. As shown in FIG. 2, the video signal processing device 100 according to Embodiment 1 processes a 3D video signal frame-sequentially including a left-eye image and a right-eye image. It is noted that FIG. 2 exemplifies a frame-sequential 3D video signal.

The image included in the 3D video signal in FIG. 2 is a full hi-vision image (1920×1080) having the frame rate of 24 Hz and scanned by the progressive scanning. Moreover, the 3D video signal shown in FIG. 2 is a frame-sequential 3D video signal alternatively including a left-eye image and a right-eye image for each picture.

In addition, FIG. 2 shows a horizontal synchronous signal (hreset), a vertical synchronous signal (vreset), a left-right ID (LRID) signal, and a frame ID (Frame ID) signal.

The horizontal synchronous signal (hreset) indicates a separation for a horizontal line. Specifically, the horizontal synchronous signal (hreset) includes pulses. Each pulse indicates a separation (i) for a line and (ii) of either the left-eye image or of the right-eye image.

The vertical synchronous signal (vreset) indicates separations for pictures. Specifically, the vertical synchronous signal (vreset) includes pulses. Each pulse indicates a separation for a picture of the left-eye image or for a picture of the right-eye image.

The LRID signal indicates whether the picture is a left-eye image or a right-eye image. The example in FIG. 2 shows the following: The picture is for the left-eye image when the LRID signal is low, and the picture is for the right-eye image when the LRID signal is high.

The FID signal repeats low and high for each frame period. The example in FIG. 2 shows that one frame includes a full hi-vision left-eye image (1920×1080) and a full hi-vision right-eye image (1920×1080).

Described below in details are the structure and the operation of the video signal processing device 100 according to Embodiment 1. It is noted that, as shown in FIG. 1, the video signal processing device 100 according to Embodiment 1 may be included in either the video signal recording and reproducing device or the video displaying device. Described here is the video signal processing device 100 included in the digital video recorder 20 that is an example of the video signal recording and reproducing device.

Figure 3:
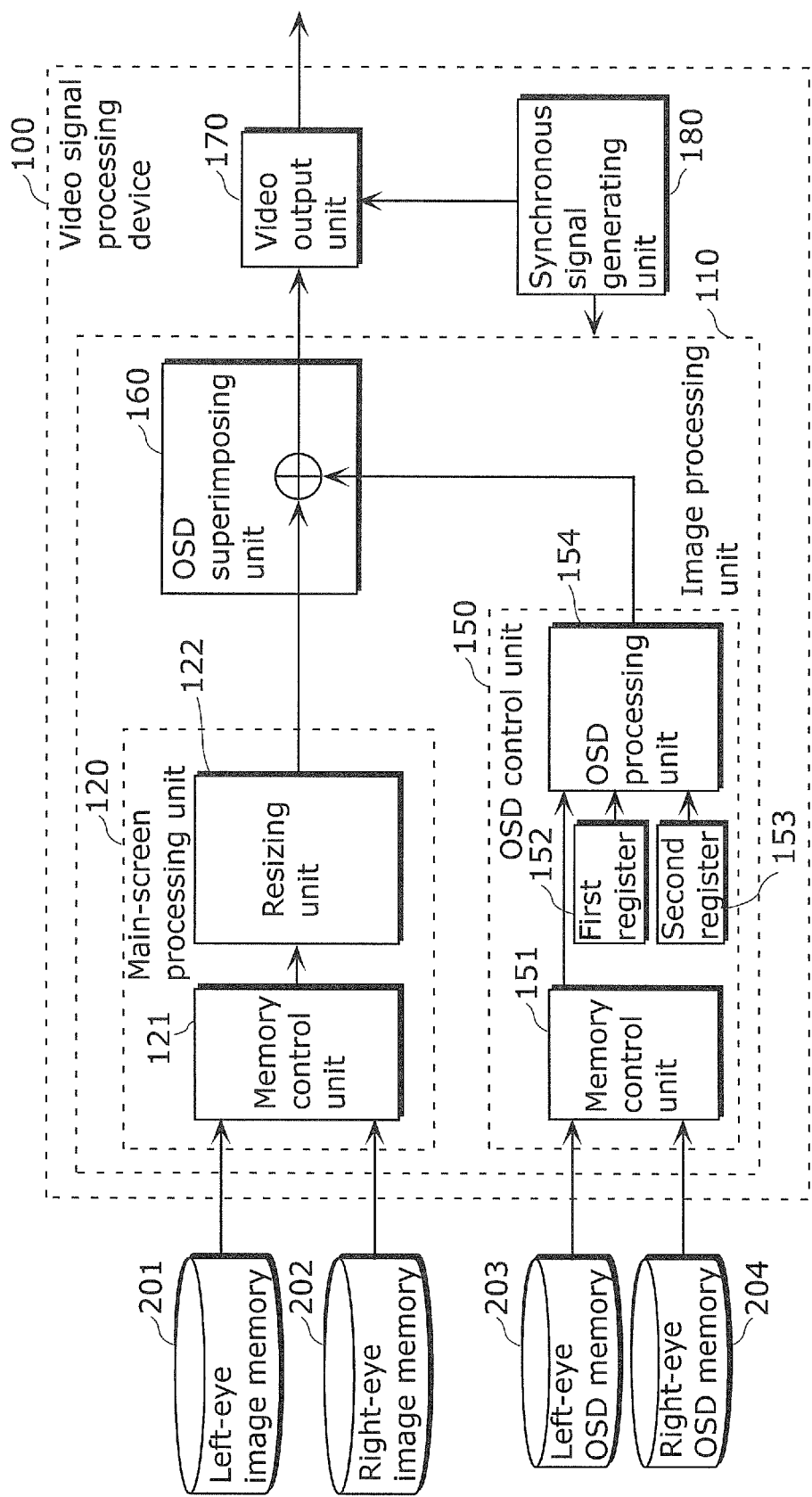
FIG. 3 depicts a block diagram showing a structure of the video signal processing device according to Embodiment 1.

FIG. 3 depicts a block diagram showing a structure of the video signal processing device 100 according to Embodiment 1. The video signal processing device 100 operates at a predetermined pixel rate (operation frequency). As shown in FIG. 3, the video signal processing device 100 includes an image processing unit 110, a video output unit 170, and a synchronous signal generating unit 180. It is noted that the input 3D video signal 52 provided to the video signal processing device 100 is temporarily stored in memory such as Dynamic Random Access Memory (DRAM).

The image processing unit 110 reads a left-eye image and a right-eye image from the memory in which the input 3D video signal 52 is temporarily stored, and resizes and synthesizes the read images. Furthermore, the image processing unit 110 generates a left-eye superimposition image and a right-eye superimposition image from 2D images including movie subtitles and a menu image, and superimposes the generated left-eye superimposition image and right-eye superimposition image on the left-eye image and right-eye image, respectively.

It is noted that the left-eye superimposition image is to be superimposed on the left-eye image. For example, the left-eye superimposition image is a left-eye OSD image generated by horizontally shifting the positions of the pixels in an OSD image. The OSD image is such as movie subtitles and a menu image. The right-eye superimposition image is to be superimposed on the right-eye image. For example, the right-eye superimposition image is a right-eye OSD image generated by horizontally shifting the positions of the pixels in an OSD image. The OSD image is such as movie subtitles and a menu image.

It is noted that, for example, the left-eye image and the right-eye image are stored in left-eye image memory 201 and right-eye image memory 202, respectively. The OSD image for generating the left-eye OSD image is stored in left-eye OSD memory 203. The OSD image for generating the right-eye OSD image is stored in right-eye OSD memory 204.

In the case where the left-eye OSD image and the right-eye OSD image are made of the same OSD image, only one of the left-eye OSD memory 203 and right-eye OSD memory 204 may be required.

The left-eye image memory 201, the right-eye image memory 202, the left-eye OSD memory 203, and the right-eye OSD memory 204 are memory such as DRAM. Such memory may be physically separated memory, may be logically separated and physically one piece of memory, or may be temporally separated and physically one piece of memory. FIG. 3 exemplifies the case where such memory is external memory for the video signal processing device 100; instead, the video signal processing device 100 may include the memory.

As shown in FIG. 3, the image processing unit 110 includes a main-screen processing unit 120, an OSD control unit 150, and an OSD superimposing unit 160. It is noted that the image processing unit 110 executes processing, by synchronizing with the video output unit 170 based on a horizontal synchronous signal and a vertical synchronous signal to be generated by the synchronous signal generating unit 180.

The main-screen processing unit 120 reads the left-eye image from the left-eye image memory 201, and resizes the read left-eye image. Furthermore, the main-screen processing unit 120 reads the right-eye image from the right-eye image memory 202, and resizes the read right-eye image. As shown in FIG. 3, the main-screen processing unit 120 includes a memory control unit 121, and a resizing unit 122.

In response to a request from the resizing unit 122, the memory control unit 121 controls reading of data from and writing of data to the left-eye image memory 201 and the right-eye image memory 202. Specifically, the memory control unit 121 controls reading and writing of image data which represents the left-eye image or the right-eye image.

The resizing unit 122 reads the left-eye image from the left-eye image memory 201 via the memory control unit 121, and resizes; that is either enlarges or reduces, the read left-eye image. The resized left-eye image is provided to the OSD superimposing unit 160. Moreover, the resizing unit 122 reads the right-eye image from the right-eye image memory 202 via the memory control unit 121, and resizes; that is either enlarges or reduces, the read right-eye image. The resized right-eye image is provided to the OSD superimposing unit 160. For example, the resizing unit 122 sequentially reads and resizes the left-eye image and the right-eye image. It is noted that the resizing unit 122 may also leave the read left-eye image and right-eye image un-resized, and provide the images to the OSD superimposing unit 160.

It is noted that the main-screen processing unit 120 may execute processing other than the resizing. For example, the main-screen processing unit 120 may switch scanning techniques (from the interlaced scanning to the progressive scanning or from the progressive scanning to the interlaced scanning), or may cut out an image.

The OSD control unit 150 reads a first image and a second image from the left-eye OSD memory 203 and the right-eye OSD memory 204, and generates a left-eye superimposition image and a right-eye superimposition image based on the read first image and second image. Specifically, the OSD control unit 150 reads a first OSD image from the left-eye OSD memory 203, and generates a left-eye OSD image based on the read first OSD image. The OSD control unit 150 reads a second OSD image from the right-eye OSD memory 204, and generates a right-eye OSD image based on the read second OSD image.

As shown in FIG. 3, the OSD control unit 150 includes a memory control unit 151, a first register 152, a second register 153, and an OSD processing unit 154.

In response to a request from the OSD processing unit 154, the memory control unit 151 controls reading of data from and writing of data to the left-eye OSD memory 203 and the right-eye OSD memory 204.

The first register 152 holds a left-eye parameter for generating the left-eye OSD image. Specifically, the first register 152 holds a left-eye parameter for horizontally shifting the positions of the pixels in the first OSD image. For example, the left-eye parameter indicates the shift amount of the pixel positions in a horizontal direction.

It is noted that the first register 152 may hold a 2D parameter indicating the position of a predetermined image to be displayed.

The second register 153 holds a right-eye parameter for generating the right-eye OSD image. Specifically, the second register 153 holds a right-eye parameter for horizontally shifting the positions of the pixels in the second OSD image. For example, the right-eye parameter indicates the shift amount of the pixel positions in a horizontal direction. It is noted that the first OSD image and the second OSD image may be the same.

By switching between the first register 152 and the second register 153 based on the vertical synchronous signal (vreset), the OSD processing unit 154 (i) obtains the left-eye parameter from the first register 152 so that the vertical synchronous signal (vreset) and the left-eye image synchronize with each other and (ii) obtains the right-eye parameter from the second register 153 so that the vertical synchronous signal (vreset) and the right-eye image synchronize with each other. In other words, the OSD processing unit 154 obtains (i) the left-eye parameter from the first register 152 at the period of processing the left-eye image and (ii) the right-eye parameter from the second register 153 at the period of processing the right-eye image. Specifically, the OSD processing unit 154 selects (i) the first register 152 at the period when the LRID signal is low and (ii) the second register 153 at the period when the LRID signal is high.

The OSD processing unit 154 generates a left-eye OSD image and a right-eye OSD image based on the left-eye parameter and the right-eye parameter. For example, the OSD processing unit 154 generates the left-eye OSD image by horizontally shifting the first OSD image as much as the shift amount indicated by the left-eye parameter. Similarly, the OSD processing unit 154 generates the right-eye OSD image by horizontally shifting the positions of the pixels in the second OSD image as much as the shift amount indicated by the right-eye parameter.

It is noted that the first register 152 and the second register 153 may also hold a cut-out parameter indicating a position where the image is cut out, as well as the parameter indicating the shift amount of pixel positions. Here, the OSD processing unit 154 obtains cut-out parameters from the first register 152 and the second register 153, and, based on the obtained parameters, cuts out the first OSD image and the second OSD image in order to generate the left-eye OSD image and the right-eye OSD image.

Moreover, the first register 152 and the second register 153 may hold parameters indicating positions of the first OSD image and the second OSD image to be displayed. The OSD processing unit 154 displays the first OSD image and the second OSD image at a different position with each other, so that the OSD processing unit 154 can generate a left-eye OSD image and a right-eye OSD image having parallax.

In the case where the provided video signal is a 2D video signal, the OSD processing unit 154 may generate a 2D OSD image, which is an example of a 2D superimposition image, by obtaining the 2D parameter held in the first register 152, and, based on the obtained 2D parameter, controlling the position of a predetermined OSD image to be displayed.

The OSD superimposing unit 160 superimposes each of the left-eye OSD image and the right-eye OSD image on a synthesized image to generate an output image. Specifically, the OSD superimposing unit 160 superimposes the left-eye OSD image on the left-eye image and the right-eye OSD image on the right-eye image. The generated output image is provided to the video output unit 170.

The video output unit 170 provides the output image to the HDMI communications unit 23. Here, the video output unit 170 operates, synchronizing with the image processing unit 110 based on a horizontal synchronous signal (hreset) and a vertical synchronous signal (vreset) generated by the synchronous signal generating unit 180.

The synchronous signal generating unit 180 generates the horizontal synchronous signal (hreset) and the vertical synchronous signal (vreset). For example, the synchronous signal generating unit 180 generates the horizontal synchronous signal and the vertical synchronous signal, based on the scanning technique of a provided 3D video signal, a frame rate, an image size, and the operation frequency of the video signal processing device 100.

For example, the video signal processing device 100 is assumed to operate at a pixel rate (operation frequency) of 148.5 MHz. As shown in FIG. 3, assumed here is the case where the provided 3D video signal is scanned by the progressive technique, the frame rate is 24 Hz, and the image size is a full hi-vision image (1920×1080).

The synchronous signal generating unit 180 counts the pulses in a clock signal of the operation frequency for the video signal processing device 100, and generates the horizontal synchronous signal (hreset). In other words the synchronous signal generating unit 180 generates a horizontal synchronous signal (hreset) including a pulse which goes from low to high when the count value reaches a first threshold value (In the example shown in FIG. 2, 2749 (when the count value starts at 0)).

It is noted that the first threshold value is the sum of an effective image period (1920 pixels) and a blanking period (830 pixels). The blanking period appears only before, only after, or both of before and after the effective image period. The blanking period is determined based on operation frequency, frame rate, and image size.

Moreover, the synchronous signal generating unit 180 counts the number of pulses included in the horizontal synchronous signal (hreset), and generates the vertical synchronous signal (vreset). In other words, the synchronous signal generating unit 180 generates the vertical synchronous signal (vreset) including a pulse which goes from low to high when the count value reaches a second threshold value (In the example shown in FIG. 2, 1124 (when the count value starts at 0)).

It is noted that the second threshold value is the sum of an effective image period (1080 lines) and a blanking period (45 lines). The blanking period appears only before, only after, or both of before and after the effective image period. The blanking period is determined based on operation frequency, frame rate, and image size.

The horizontal synchronous signal (hreset) and the vertical synchronous signal (vreset) generated above are provided to the image processing unit 110 and the video output unit 170. It is noted that the image processing unit 110 and the video output unit 170 operate based on the same synchronous signal.

Figure 4:
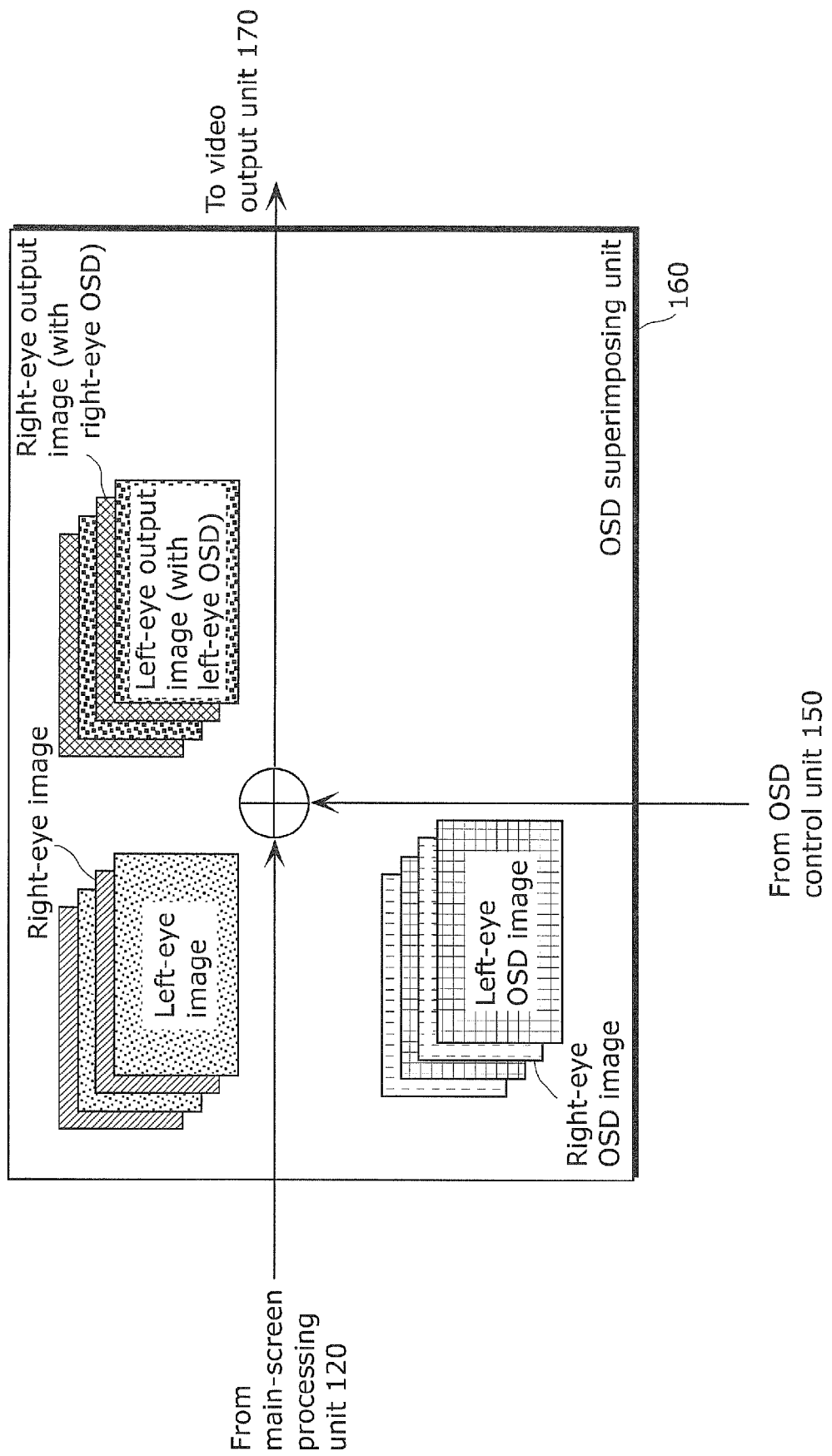
FIG. 4 schematically shows how on-screen display (OSD) images are superimposed according to Embodiment 1.

Described next is how to superimpose the left-eye OSD image on the left-eye image and the right-eye OSD image on the right-eye image. FIG. 4 schematically shows how the on-screen display (OSD) images are superimposed according to Embodiment 1.

As shown in FIG. 2, the 3D video signal in Embodiment 1 frame-sequentially includes the left-eye image and the right-eye image. In other words, as shown in FIG. 4, the OSD superimposing unit 160 alternatively receives, from the main-screen processing unit 120, the left-eye image and the right-eye image for each picture. Here, the separation between a picture for the left-eye image and a picture for the right-eye image is determined by the vertical synchronous signal (vreset) generated by the synchronous signal generating unit 180.

As described above, the OSD control unit 150 sequentially generates a left-eye OSD image and a right-eye OSD image for each picture by switching between the first register 152 and the second register 153. Here, for each input of the pulse of the vertical synchronous signal (vreset), the OSD control unit 150 switches between the first register 152 and the second register 153. Hence, the OSD control unit 150 alternatively generates the left-eye OSD image and the right-eye OSD image for each picture. Thus, as shown in FIG. 4, the OSD superimposing unit 160 alternatively receives, from the OSD control unit 150, the left-eye OSD image and the right-eye OSD image for each picture.

The OSD superimposing unit 160 receives the horizontal synchronous signal (hreset) and the vertical synchronous signal (vreset) generated by the synchronous signal generating unit 180. Based on the received horizontal synchronous signal (hreset) and the vertical synchronous signal (vreset), the OSD superimposing unit 160 superimposes the left-eye OSD image on the left-eye image, and the right-eye OSD image on the right-eye image. Using the vertical synchronous signal (vreset), the OSD superimposing unit 160 can determine the separation between the picture for the left-eye image and the picture for the right-eye image; that is the separation between the left-eye OSD image and the right-eye OSD image.

Hence, the OSD superimposing unit 160 alternatively generates, for each picture, the left-eye output image having the left-eye OSD image superimposed, and the right-eye output image having the right-eye OSD image superimposed. The generated left-eye output images and right-eye output images are provided to the video output unit 170. The video output unit 170 provides to the HDMI communications unit 23 a video which frame-sequentially includes the left-eye output images and the right-eye output images as an output video.

Described next is how the video signal processing device 100 according to Embodiment 1 operates.

Figure 5:
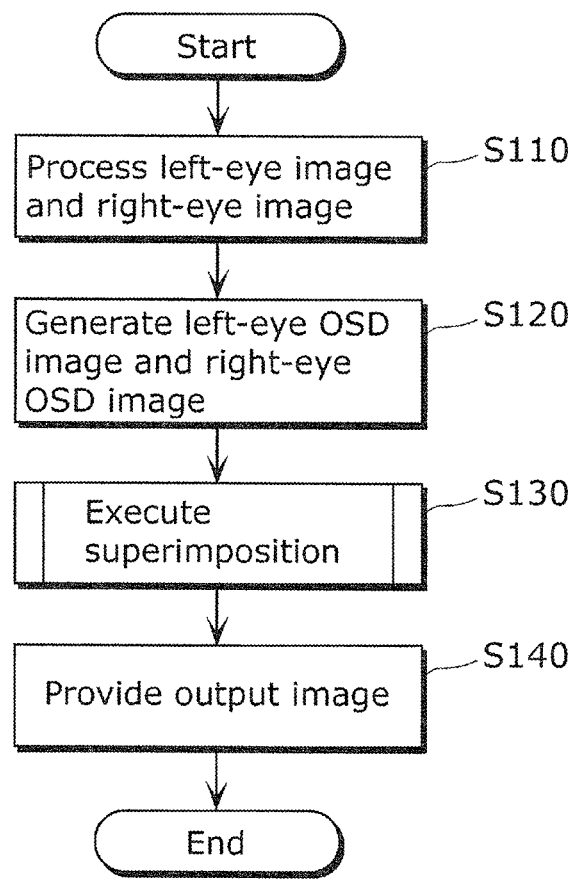
FIG. 5 depicts a flowchart exemplifying an operation of the video signal processing device according to Embodiment 1.

FIG. 5 depicts a flowchart exemplifying an operation of the video signal processing device 100 according to Embodiment 1.

First, the main-screen processing unit 120 sequentially processes each of a left-eye image and a right-eye image (S110).

Specifically, as the processing on the left-eye image, the main-screen processing unit 120 reads the left-eye image from the left-eye image memory 201 and resizes the read left-eye image. Next, as the processing on the right-eye image, the main-screen processing unit 120 reads the right-eye image from the right-eye image memory 202 and resizes the read right-eye image.

Then, the OSD control unit 150 generates a left-eye OSD image and a right-eye OSD image (S120). Specifically, the OSD processing unit 154 included in the OSD control unit 150 switches between the first register 152 and the second register 153 based on the vertical synchronous signal (vreset), and sequentially generates the left-eye OSD image and the right-eye OSD image.

Figure 6:
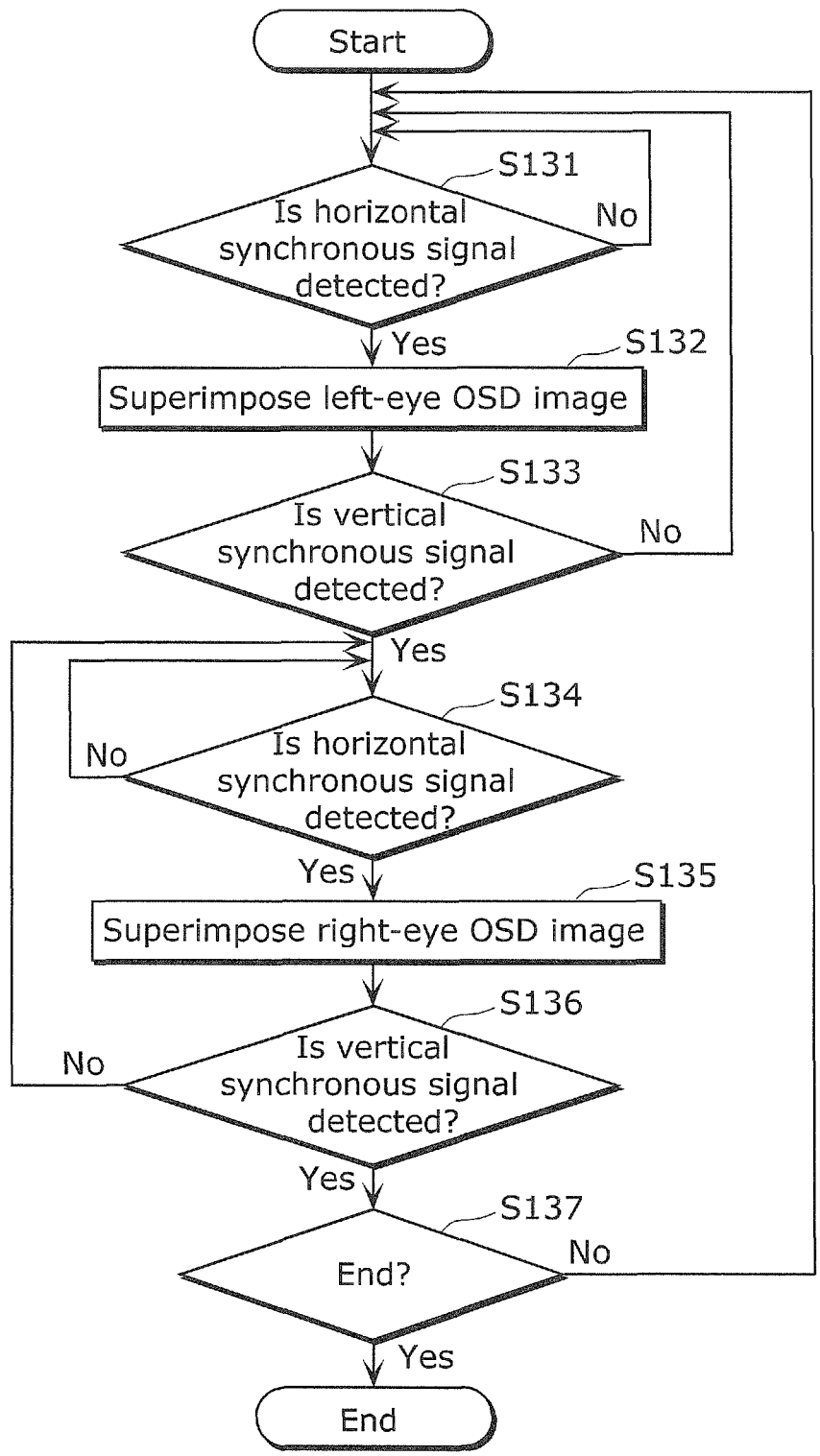
FIG. 6 depicts a flowchart exemplifying an operation of an OSD superimposing unit according to Embodiment 1.

Then, the OSD superimposing unit 160 superimposes each of the left-eye OSD image and the right-eye OSD image on a synthesized image (S130). Later, FIG. 6 shows in details how the OSD superimposing unit 160 executes the superimposition. The generated output image through the superimposition is provided to the video output unit 170.

Finally, the video output unit 170 provides the output image (S140). Specifically, the video output unit 170 alternatively provides the left-eye output image and the right-eye output image for each picture, based on the horizontal synchronous signal (hreset) and the vertical synchronous signal (vreset).

Described next is the details of the superimposition according to Embodiment 1. FIG. 6 depicts a flowchart exemplifying an operation of the OSD superimposing unit 160 according to Embodiment 1.

First, the OSD superimposing unit 160 executes the detection of the horizontal synchronous signal (hreset) (S131). In the case where the pulse of the horizontal synchronous signal (hreset) is detected (S131: Yes), the OSD superimposing unit 160 superimposes left-eye OSD images for one line on left-eye images for one line (S132). The OSD superimposing unit 160 repeats superimposing the left-eye OSD images until the pulse of the vertical synchronous signal (vreset) is detected (S133).

In the case where the OSD superimposing unit 160 detects the pulse of the vertical synchronous signal (vreset) (S133: Yes), the OSD superimposing unit 160 executes the detection of the horizontal synchronous signal (hreset) (S134). In the case where the pulse of the horizontal synchronous signal (hreset) is detected (S134: Yes), the OSD superimposing unit 160 superimposes right-eye images for one line on OSD images for one line (S135). The OSD superimposing unit 160 repeats superimposing the right-eye OSD images until the pulse of the vertical synchronous signal (vreset) is detected (S136).

Moreover, the OSD superimposing unit 160 repeats the above superimposition (S131 to S136) until the 3D video signal ends or the left-eye OSD images and the right-eye OSD images end (S137).

As described above, the OSD superimposing unit 160 sequentially executes the superimposition of the left-eye OSD image and the right-eye OSD image for each picture. In other words, the OSD superimposing unit 160 superimposes (i) the left-eye OSD image on the left-eye image in a first period and (ii) the right-eye image on the right-eye image in a second period which is different from the first period. The first period and the second period are determined by the vertical synchronous signal.

It is noted that in the above operation, the superimposition is executed for each line; instead, the superimposition may be executed for each picture.

As described above, the video signal processing device 100 according to Embodiment 1 includes the first register 152 holding a left-eye parameter for generating a left-eye superimposition image, the second register 153 holding a right-eye parameter for generating a right-eye superimposition image, and the OSD processing unit 154 generating a left-eye superimposition image and a right-eye superimposition image.

A conventional video signal processing device which provides 2D videos includes, for example, a register holding parameters for generating superimposition images and an OSD processing unit generating the superimposition images based on the parameters. Hence, the video signal processing device 100 according to Embodiment 1 simply includes an extra register, so that the video signal processing device 100 can use the existing register as the first register 152, the extra register as the second register 153, and the existing OSD processing unit as the OSD processing unit 154 according to the embodiment.

Thanks to the above structure, the video signal processing device 100 according to Embodiment 1 can be provided without a significant change in circuit structure of the conventional video signal processing device. This feature contributes to reducing the cost increase of the video signal processing device and processing 3D video signals.

Embodiment 2

A video signal processing device according to Embodiment 2 processes a 3D video signal line-sequentially includes a left-eye image and a right-eye image. The video signal processing device features to have a left-eye OSD control unit generating a left-eye superimposition image and a right-eye OSD control unit generating a right-eye superimposition image. The left-eye OSD control unit includes a register holding a left-eye parameter for generating the left-eye superimposition image, and a left-eye OSD processing unit generating the left-eye superimposition image based on the left-eye parameter. The right-eye OSD control unit includes a register holding a right-eye parameter for generating the right-eye superimposition image, and a right-eye OSD processing unit generating the right-eye superimposition image based on the right-eye parameter. In other words, the video signal processing device according to Embodiment 2 features to include two registers and two OSD processing units.

Figure 7:
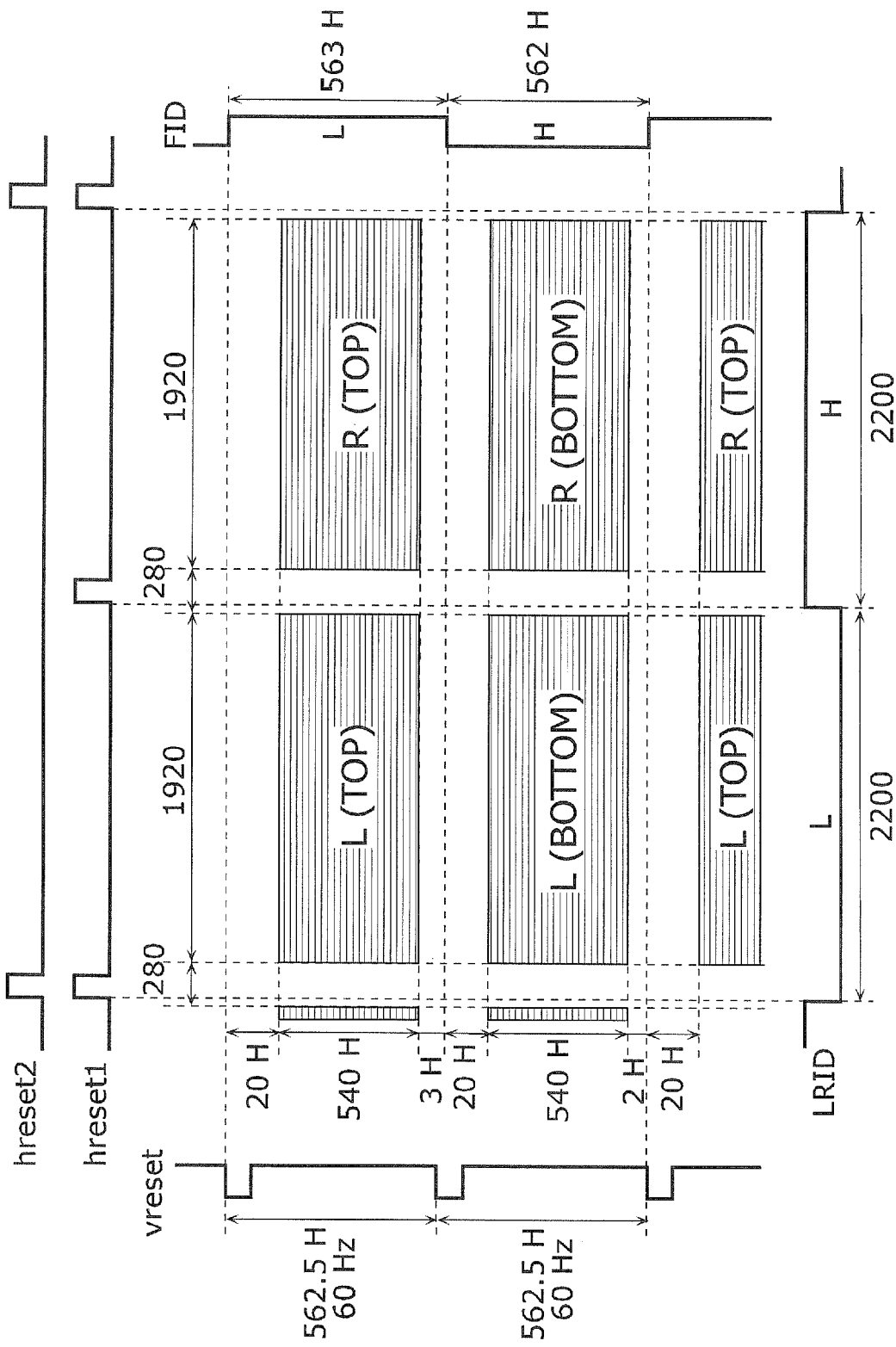
FIG. 7 exemplifies a line-sequential 3D video signal.

Described first is an example of a 3D video signal which the video signal processing device according to Embodiment 2 processes. As shown in FIG. 7, the video signal processing device according to Embodiment 2 processes a 3D video signal including a left-eye image and a right-eye image using a line sequential technique. FIG. 7 exemplifies a line-sequential 3D video signal.

The image included in the 3D video signals in FIG. 7 is a full hi-vision image (1920×1080) having the frame rate of 60 Hz and scanned by the interlaced scanning. Moreover, the 3D video signal shown in FIG. 7 is a line-sequential 3D video signal alternatively including a left-eye image and a right-eye image for each line.

In addition, FIG. 7 shows a horizontal synchronous signal (hreset1) for providing video, a horizontal synchronous signal (hreset2) for superimposition, a vertical synchronous signal (vreset), a LRID signal, and a Frame ID signal.

The horizontal synchronous signal (hreset1) for providing video is an example of a first synchronous signal, and indicates a separation for a horizontal line of each picture. In other words, the horizontal synchronous signal (hreset1) for providing video includes pulses. Each pulse indicates a separation for a horizontal line of the left-eye image and a separation for a horizontal line of the right-eye image.

The horizontal synchronous signal (hreset2) for superimposition is an example of a second synchronous signal, and indicates where the horizontal lines are separated for each frame. Specifically, the horizontal synchronous signal (hreset2) for superimposition includes pulses. Each pulse indicates either a separation for a line of the left-eye image or a separation for a line of the right-eye image. The example in FIG. 7 shows that the pulses the separations for the lines of the right-eye images. Hence, when a processing unit receives the horizontal synchronous signal (hreset2) for superimposition, the unit can process the left-eye image and the right-eye image as a one-frame image.

Since the 3D video signal of FIG. 7 includes one left-eye image and one right-eye image in one frame, the horizontal synchronous signal (hreset1) for providing video has, within a certain period, twice as many pulses as the horizontal synchronous signal (hreset2) has within the same period.

The vertical synchronous signal (vreset) indicates a separation for a picture. The 3D video signal in FIG. 7 is a video signal for the interlaced scanning. Thus, the vertical synchronous signal (vreset) indicates a separation of a field.

The LRID signal indicates whether the picture (field) is a left-eye image or a right-eye image. The example in FIG. 7 shows that the picture is for the left-eye image when the LRID signal is low. The picture is for the right-eye image when the LRID signal is high.

The FID signal repeats low and high for each frame period. The example in FIG. 7 shows that each frame includes (i) one of a top field and a bottom field (1920×540) of a full hi-vision left-eye image and (ii) one of a top field and a bottom field (1920×540) of a full hi-vision right-eye image.

Figure 8:
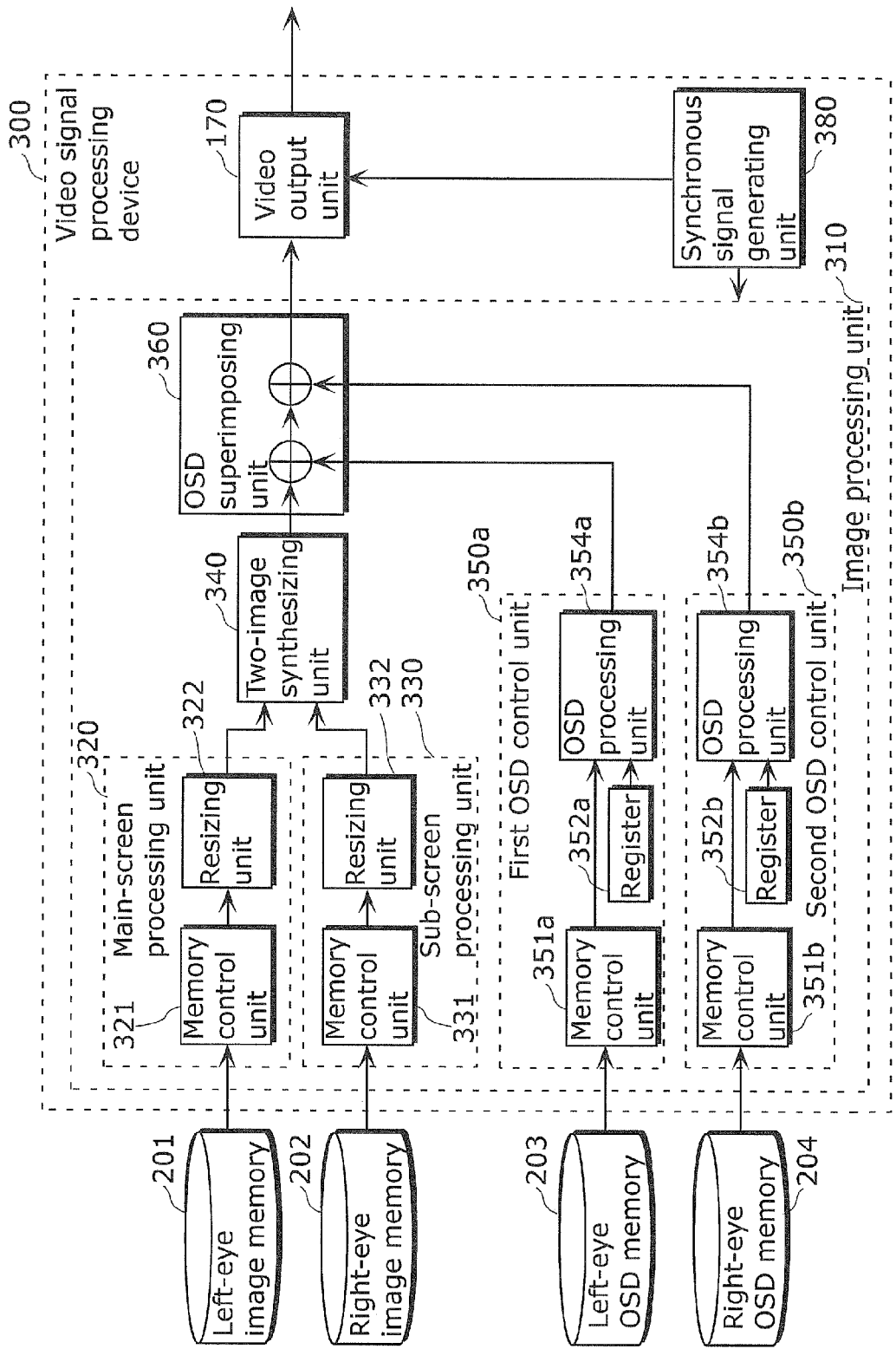
FIG. 8 depicts a block diagram showing a structure of the video signal processing device according to Embodiment 2.

Described below in details are the structure and the operation of the video signal processing device according to Embodiment 2. FIG. 8 depicts a block diagram showing a structure of a video signal processing device 300 according to Embodiment 2.

Similar to the video signal processing device 100 according to Embodiment 1, the video signal processing device 300 according to Embodiment 2 is included in the digital video recorder 20 and the digital TV 30 forming the video signal processing system 10 shown in FIG. 1.

It is noted that the same structural elements as those in the video signal processing device 100 according to Embodiment 1 share the same numerical references, and the details thereof shall be omitted. Thus, chiefly described below are the differences between the video signal processing device 300 according to Embodiment 2 and the video signal processing device 100 according to Embodiment 1.

As shown in FIG. 8, the video signal processing device 300 according to Embodiment 2 includes an image processing unit 310 and a synchronous signal generating unit 380 instead of the image processing unit 110 and the synchronous signal generating unit 180. Furthermore, the image processing unit 310 includes a main-screen processing unit 320, a sub-screen processing unit 330, a two-screen synthesizing unit 340, a first OSD control unit 350a, a second OSD control unit 350b, and an OSD superimposing unit 360.

The main-screen processing unit 320 reads a left-eye image from the left-eye image memory 201 and resizes the read left-eye image. As shown in FIG. 8, the main-screen processing unit 320 includes a memory control unit 321, and a resizing unit 322.

In response to a request from the resizing unit 322, the memory control unit 321 controls reading of data from and writing of data to the left-eye image memory 201. Specifically, the memory control unit 321 controls reading and writing of image data which represents the left-eye image.

The resizing unit 322 reads the left-eye image from the left-eye image memory 201 via the memory control unit 321, and resizes; that is either enlarges or reduces, the read left-eye image. The resized left-eye image is provided to two-screen synthesizing unit 340. It is noted that the resizing unit 322 may leave the read left-eye image un-resized, and provide the image to the two-screen synthesizing unit 340.

It is noted that main-screen processing unit 320 may execute processing other than the resizing. For example, the main-screen processing unit 320 may switch scanning techniques (from the interlaced scanning to the progressive scanning or from the progressive scanning to the interlaced scanning), or may cut out an image.

Moreover, in the case where a provided video signal is a 2D video signal including 2D images, the main-screen processing unit 320 may also execute processing such as resizing the 2D images. Furthermore, in the case where the 2D video signal includes a Picture-in-Picture (PinP) image formed of a main-screen image and a sub-screen image, the main-screen processing unit 320 may resize the main-screen image.

Furthermore, the sub-screen processing unit 330 reads the right-eye image from the right-eye image memory 202, and resizes the read right-eye image. As shown in FIG. 8, the sub-screen processing unit 330 includes a memory control unit 331, and a resizing unit 332.

In response to a request from the resizing unit 332, the memory control unit 331 controls reading of data from and writing of data to the right-eye image memory 202. Specifically, the memory control unit 331 controls reading and writing of image data which represents the right-eye image.

The resizing unit 332 reads the right-eye image from the right-eye image memory 202 via the memory control unit 331, and resizes; that is either enlarges or reduces, the read right-eye image. The resized right-eye image is provided to the two-screen synthesizing unit 340. It is noted that the resizing unit 332 may leave the read right-eye image un-resized, and provide the image to the two-screen synthesizing unit 340.

It is noted that sub-screen processing unit 330 may execute processing other than the resizing. For example, the sub-screen processing unit 330 may switch scanning techniques (from the interlaced scanning to the progressive scanning or from the progressive scanning to the interlaced scanning), or may cut out an image.

In the case where the provided video signal is a 2D video signal including a PinP image, the sub-screen processing unit 330 may resize the sub-screen image.

The two-screen synthesizing unit 340 synthesizes, based on a predetermined format, the left-eye image provided from the main-screen processing unit 320 and the right-eye image provided from the sub-screen processing unit 330, and generates a synthesized image. Here, the two-screen synthesizing unit 340 synthesizes the left-eye image and the right-eye image based on the horizontal synchronous signal (hreset2) for superimposition, so that the left-eye image and the right-eye image are line-sequentially included in one frame as shown in FIG. 7. The generated synthesized image is provided to the OSD superimposing unit 360. It is noted that the 3D video signal shown in FIG. 7 exemplifies a video signal provided from the two-screen synthesizing unit 340.

In the case where the provided video signal is a 2D video signal including a PinP image, the two-screen synthesizing unit 340 may synthesize the main-screen image provided from the main-screen processing unit 320 and the sub-screen image provided from the sub-screen processing unit 330.

The first OSD control unit 350a is an example of the left-eye OSD control unit. The first OSD control unit 350a reads a first OSD image from the left-eye OSD memory 203, and generates a left-eye OSD image based on the read first OSD image. As shown in FIG. 8, the first OSD control unit 350a includes a memory control unit 351a, a register 352a, and an OSD processing unit 354a.

In response to a request from the OSD processing unit 354a, the memory control unit 351a controls reading of data from and writing of data to the left-eye OSD memory 203. Specifically, the memory control unit 351a controls reading and writing of image data which represents the first OSD image right-eye image.

The register 352a holds a left-eye parameter for generating the left-eye OSD image. Specifically, the register 352a holds a left-eye parameter for horizontally shifting the positions of the pixels in the first OSD image. For example, the left-eye parameter indicates the shift amount of the pixel positions in a horizontal direction. It is noted that the register 352*a* may hold a cut-out parameter indicating a position where the image is cut out.

The OSD processing unit 354*a* is an example of a left-eye OSD processing unit. The OSD processing unit 354*a* obtains the left-eye parameter from the register 352*a*, and generates a left-eye OSD image based on the obtained left-eye parameter. For example, the OSD processing unit 354*a* generates the left-eye OSD image by shifting the positions of the pixels in the first OSD image as much as the shift amount indicated by the left-eye parameter.

The OSD processing unit 354*a* further generates in the right-eye image area a transparent image through which an image-to-be-superimposed to passes. Specifically, the transparent image generated by the OSD processing unit 354*a* is a right-eye transparent image through which the right-eye image passes. The left-eye OSD image and the transparent image are provided as a one-frame image to the OSD superimposing unit 360.

The second OSD control unit 350*b* is an example of the right-eye OSD control unit. The second OSD control unit 350*b* reads a second OSD image from the right-eye OSD memory 204, and generates a right-eye OSD image based on the read second OSD image. As shown in FIG. 8, the second OSD control unit 350*b* includes a memory control unit 351*b*, a register 352*b*, and an OSD processing unit 354*b*.

In response to a request from the OSD processing unit 354*b*, the memory control unit 351*b* controls reading of data from and writing of data to the right-eye OSD memory 204. Specifically, the memory control unit 351*b* controls reading and writing of image data which represents the second OSD.

The register 352*b* holds a right-eye parameter for generating the right-eye OSD image. Specifically, the register 352*b* holds a right-eye parameter for horizontally shifting the positions of the pixels in the second OSD image. For example, the right-eye parameter indicates the shift amount of the pixel positions in a horizontal direction. It is noted that the register 352*b* may hold a cut-out parameter indicating a position where the image is cut out.

The OSD processing unit 354*b* is an example of a right-eye OSD processing unit. The OSD processing unit 354*b* obtains the right-eye parameter from the register 352*b*, and generates a right-eye OSD image based on the obtained right-eye parameter. For example, the OSD processing unit 354*b* generates the right-eye OSD image by shifting the positions of the pixels in the second OSD image as much as the shift amount indicated by the right-eye parameter.

The OSD processing unit 354*b* further generates, in the left-eye image area, a transparent image through which the transparent image passes. Specifically, the transparent image generated by the OSD processing unit 354*b* is a left-eye transparent image through which the left-eye image passes. The right-eye OSD image and the transparent image are provided as a one-frame image to the OSD superimposing unit 360.

The OSD superimposing unit 360 superimposes, on the synthesized image provided from the two-screen synthesizing unit 340, (i) the left-eye image and the right-eye transparent image both provided from the first OSD control unit 350*a* and (ii) the right-eye image and the left-eye superimposition image both provided from the second OSD control unit 350*b*. Specific processing thereof shall be described later, with reference to the drawings.

The synchronous signal generating unit 380 generates the horizontal synchronous signal (hreset1) for providing video, the horizontal synchronous signal (hreset2) for superimposition, and the vertical synchronous signal (vreset). The detailed structure of the synchronous signal generating unit 380 shall be described in FIG. 9. It is noted that FIG. 9 depicts a block diagram exemplifying a structure of the synchronous signal generating unit 380 according to Embodiment 2.

Figure 9:
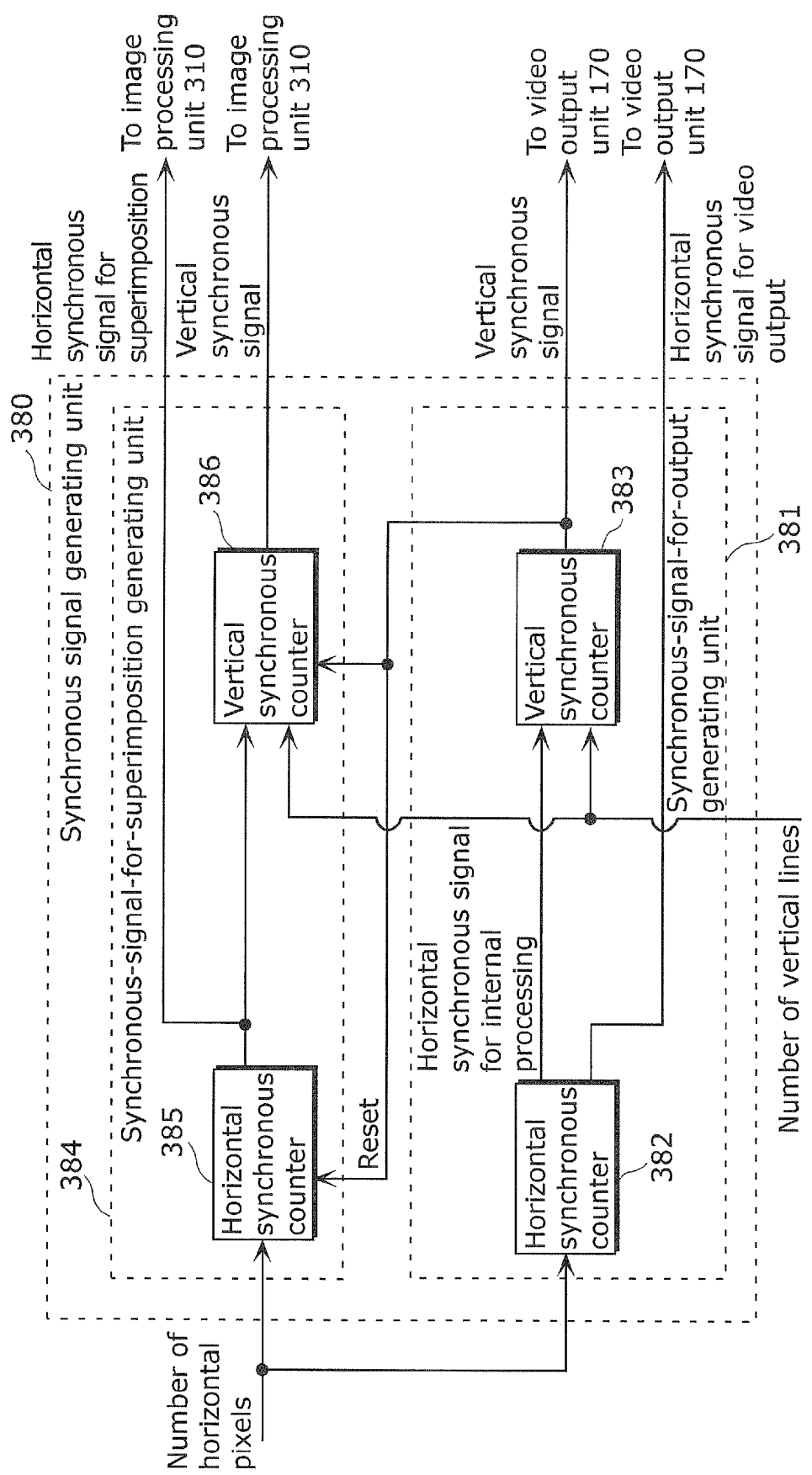
FIG. 9 depicts a block diagram exemplifying a structure of a synchronization signal generating unit according to Embodiment 2.

As shown in FIG. 9, the synchronous signal generating unit 380 includes a synchronous-signal-for-output generating unit 381, and a synchronous-signal-for-superimposition generating unit 384.

The synchronous-signal-for-output generating unit 381 generates the horizontal synchronous signal (hreset1) for providing video and the vertical synchronous signal (vreset), and provides the generated signals to the video output unit 170. As shown in FIG. 9, the synchronous-signal-for-output generating unit 381 includes a horizontal synchronous counter 382, and a vertical synchronous counter 383.

The horizontal synchronous counter 382 counts the pulses in a clock signal of the operation frequency for the video signal processing device 300, and generates a horizontal synchronous signal for internal processing and the horizontal synchronous signal (hreset1) for providing video. Specifically, the horizontal synchronous counter 382 generates the horizontal synchronous signal for internal processing including a pulse which goes from low to high when the count value reaches the number of horizontal pixels. Moreover, the horizontal synchronous counter 382 generates the horizontal synchronous signal (hreset1) for providing video including a pulse which goes from low to high when the count value reaches the number of horizontal pixels and a half of the number of horizontal pixels.

Here, the number of horizontal pixels is an example of a predetermined threshold value determined based on operation frequency, frame rate, and image size. The example of the number in FIG. 7 is 4399 (when the count value starts at 0). In other words, the number of horizontal pixels is the sum of an effective image period (1920 pixels+1920 pixels) and a blanking period (280 pixels+280 pixels).

The generated horizontal synchronous signal (hreset1) for providing video is provided to the video output unit 170. The horizontal synchronous signal for internal processing is provided to the vertical synchronous counter 383.

The vertical synchronous counter 383 counts the number of pulses included in the horizontal synchronous signal for internal processing generated by the horizontal synchronous counter 382, and generates the vertical synchronous signal (vreset). Specifically, the vertical synchronous counter 383 generates the vertical synchronous signal (vreset) including a pulse which goes from low to high when the count value reaches the number of vertical lines.

Here, the number of vertical lines is an example of a predetermined threshold value determined based on operation frequency frame rate, and image size. In the example shown in FIGS. 7, 563 and 562 are alternatively repeated. In other words, the vertical synchronous signal (vreset) is generated for every 562.5th line on average.

The generated vertical synchronous signal (vreset) is provided to the video output unit 170 and the synchronous-signal-for-superimposition generating unit 384.

The synchronous-signal-for-superimposition generating unit 384 generates the horizontal synchronous signal (hreset2) for superimposition and the vertical synchronous signal (vreset), and provides the generated signals to the image processing unit 110. As shown in FIG. 9, the synchronous-signal-for-superimposition generating unit 384 includes a horizontal synchronous counter 385 and a vertical synchronous counter 386.

The horizontal synchronous counter 385 counts the pulses in a clock signal of the operation frequency for the video signal processing device 300, and generates the horizontal synchronous signal (hreset2) for superimposition. Specifically, the horizontal synchronous counter 385 generates the horizontal synchronous signal (hreset2) for superimposition including a pulse which goes from low to high when the count value reaches the above number of horizontal pixels.

It is noted that the horizontal synchronous counter 385 resets the count value to 0 upon receiving the vertical synchronous signal (vreset) from the vertical synchronous counter 383. This is because the horizontal synchronous counter 385 synchronizes the image processing unit 310 with the video output unit 170. The generated horizontal synchronous signal (hreset2) for superimposition is provided to the vertical synchronous counter 386 and the image processing unit 310.

The vertical synchronous counter 386 counts the number of pulses included in the horizontal synchronous signal (hreset 2) for superimposition generated by the horizontal synchronous counter 385, and generates the vertical synchronous signal (vreset). Specifically, the vertical synchronous counter 386 generates the vertical synchronous signal (vreset) when the count value reaches the above the number of vertical lines.

It is noted that the vertical synchronous counter 386 resets the count value to 0 upon receiving the vertical synchronous signal (vreset) from the vertical synchronous counter 383. This is because the horizontal synchronous counter 386 synchronizes the image processing unit 310 with the video output unit 170. The above operation allows the vertical synchronous counter 386 to generate the vertical synchronous signal (vreset) with the same timing the vertical synchronous counter 383 does. The generated vertical synchronous signal (vreset) is provided to the image processing unit 310.

It is noted that the vertical synchronous signal (vreset) is used both for providing video and for superimposition. Thus, the vertical synchronous signal (vreset) may be generated by either the synchronous-signal-for-output generating unit 381 or the synchronous-signal-for-superimposition generating unit 384, and provided to the video output unit 170 and the image processing unit 110.

Figure 10:
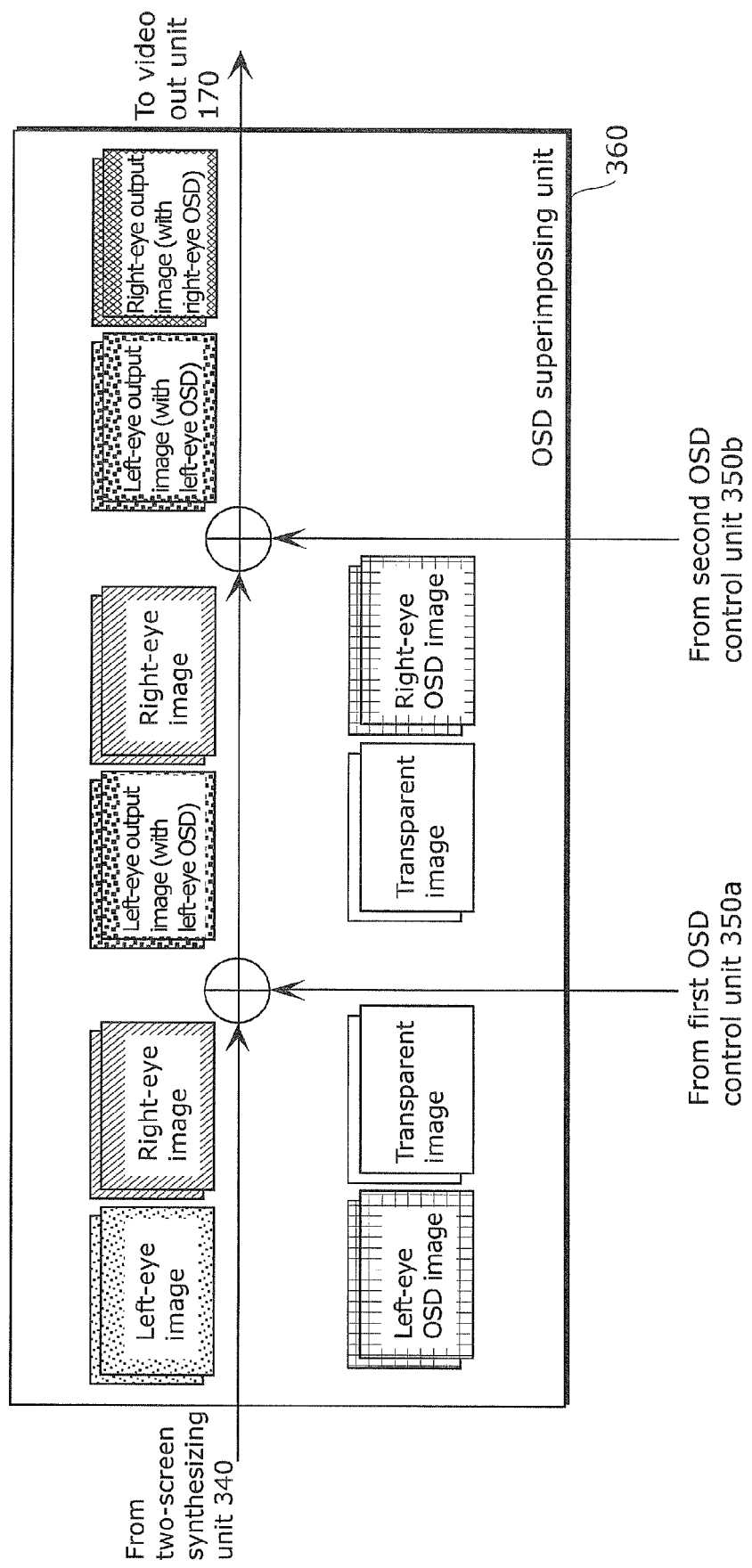
FIG. 10 schematically shows how to superimpose OSD images according to Embodiment 2.

Described next is how to superimpose the left-eye OSD image on the left-eye image and the right-eye OSD image on the right-eye image. FIG. 10 schematically shows how OSD images are superimposed according to Embodiment 2.

As shown in FIG. 7, the 3D video signal in Embodiment 2 line-sequentially includes a left-eye image and a right-eye image. In other words, as shown in FIG. 10, the OSD superimposing unit 360 receives from the two-screen synthesizing unit 340 the left-eye image and the right-eye image as a one-frame image. Here, as shown in FIG. 7, the OSD superimposing unit 360 receives the horizontal synchronous signal (hreset2) for superimposition. Hence, the OSD superimposing unit 360 identifies the left-eye image and the right-eye image as a one-frame image without identifying the separation therebetween.

The first OSD control unit 350*a* generates a left-eye OSD image and a transparent image as a one-frame image. Specifically, the first OSD control unit 350*a* receives the horizontal synchronous signal (hreset2) for superimposition. Thus, the first OSD control unit 350*a* identifies the transparent image generated in the right-eye image area and the left-eye OSD image as a one-frame image without identifying the end of the left-eye OSD image.

Similarly, the second OSD control unit 350*b* generates a right-eye OSD image and a transparent image as a one-frame image. Specifically, the second OSD control unit 350*b* receives the horizontal synchronous signal (hreset2) for superimposition. Thus, the second OSD control unit 350*b* identifies the transparent image generated in the left-eye image area and the right-eye OSD image as a one-frame image without identifying the start of the right-eye OSD image.

As described above, the OSD superimposing unit 360 receives from the two-screen synthesizing unit 340 a synthesized image including the left-eye image and the right-eye image formed in a one-frame image. Furthermore, the OSD superimposing unit 360 receives (i) from the first OSD control unit 350*a* the left-eye OSD image and the right-eye transparent image formed in a one-frame image and (ii) from the second OSD control unit 350*b* the right-eye OSD image and the left-eye transparent image formed in a one-frame image.

First, the OSD superimposing unit 360 superimposes, on the synthesized image, the left-eye OSD image and the right-eye transparent image provided from the first OSD control unit 350*a*. Specifically, the OSD superimposing unit 360 superimposes the left-eye OSD image on the left-eye image and the right-eye transparent image on the right-eye image. This operation allows the OSD superimposing unit 360 to generate a superimposed synthesized image including (i) a left-eye output image with the left-eye OSD image superimposed thereon and (ii) the right-eye image.

Next, the OSD superimposing unit 360 superimposes, on the superimposed synthesized image, the right-eye OSD image and the left-eye transparent image provided from the second OSD control unit 350*b*. Specifically, the OSD superimposing unit 360 superimposes the left-eye transparent image on the left-eye output image and the right-eye OSD image on the right-eye image. This operation allows the OSD superimposing unit 360 to generate an output image including (i) the left-eye output image with the left-eye OSD image superimposed thereon and (ii) the right-eye output image with the right-eye OSD image superimposed thereon, and to provide the output image to the video output unit 170.

Described next is how the video signal processing device 300 according to Embodiment 2 operates. It is noted that the main operation of the video signal processing device 300 according to Embodiment 2 is the same as that of the video signal processing device 100 according to Embodiment 1 shown in FIG. 5. Thus, mainly described hereinafter are the differences between the operations.

Figure 11:
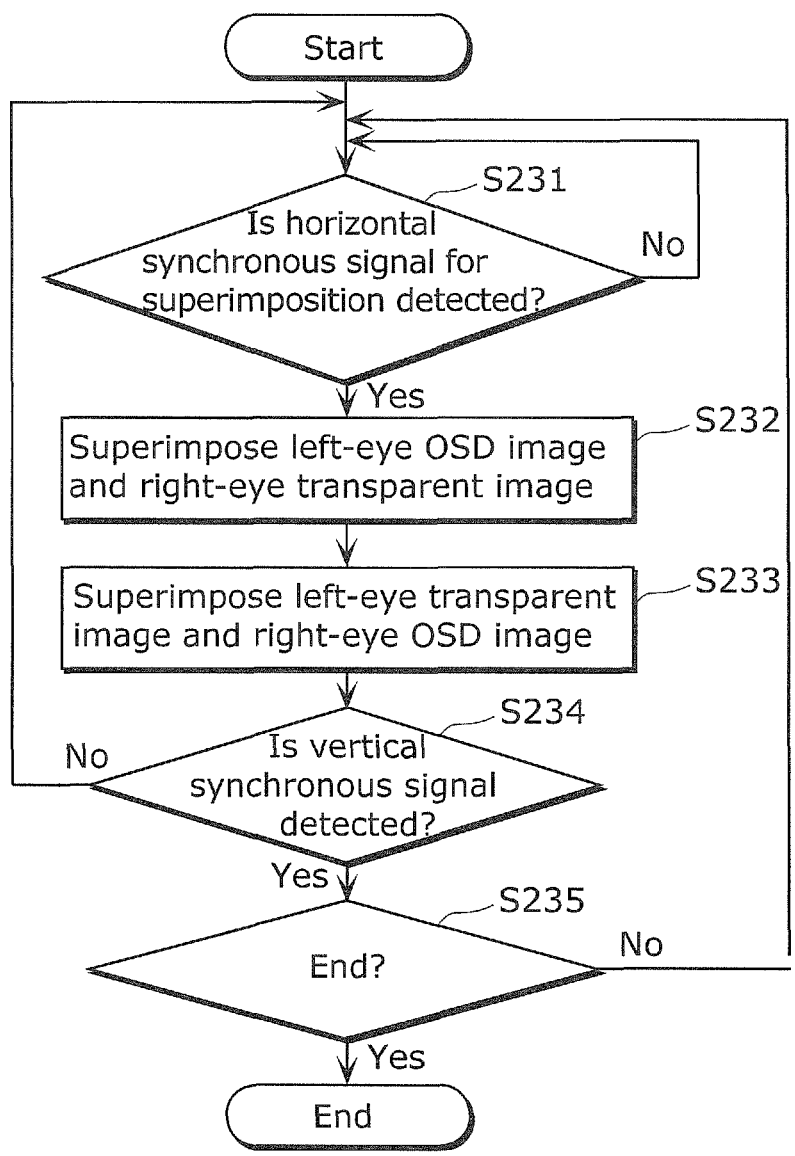
FIG. 11 depicts a flowchart exemplifying an operation of an OSD superimposing unit according to Embodiment 2.

FIG. 11 depicts a flowchart exemplifying an operation of the OSD superimposing unit 360 according to Embodiment 2.

First, the OSD superimposing unit 360 executes the detection of the horizontal synchronous signal (hreset2) for superimposition (S231). In the case where the pulse of the horizontal synchronous signal (hreset2) for superimposition is detected (S231: Yes), the OSD superimposing unit 360 superimposes left-eye OSD images and right-eye transparent images for one line on synthesized images for one line (S232). Then, the OSD superimposing unit 360 superimposes left-eye transparent images and right-eye OSD images for one line on superimposed synthesized images for one line (S233).

The OSD superimposing unit 360 repeats the superimposition (S231 to S233) until the pulse of the vertical synchronous signal (vreset) is detected (S234). Moreover, the OSD superimposing unit 360 repeats the superimposition (S231 to S234) until the 3D video signal ends or the left-eye OSD images and the right-eye OSD images end (S235).

Hence, the OSD superimposing unit 360 identifies the left-eye image and the right-eye image as one picture (one frame), and executes the superimposition of the left-eye OSD image and the right-eye OSD image.

It is noted that the output image, including the left-eye output image and the right-eye output image both generated through the superimposition, is provided by the video output unit 170 based on the horizontal synchronous signal (hreset1) for providing video.

It is noted that in the above operation, the superimposition is executed for each line; instead, the superimposition may be executed for each picture. Moreover, the above operation involves superimposing the left-eye OSD image and the right-eye transparent image, followed by superimposing the left-eye transparent image and the right-eye OSD image; instead, the operation may involve superimposing the left-eye transparent image and the right-eye OSD image, followed by superimposing the left-eye OSD image and the right-eye transparent image.

As described above, the video signal processing device 300 according to Embodiment 2 includes the first OSD control unit 350a generating a left-eye OSD image and the second OSD control unit 350b generating a right-eye OSD image. The first OSD control unit 350a includes the register 352a holding a left-eye parameter, and the OSD processing unit 354a generating a left-eye OSD image based on the left-eye parameter. The second OSD control unit 350b includes the register 352b holding a right-eye parameter, and the OSD processing unit 354b generating the right-eye OSD image based on the right-eye parameter.

Specifically, the video signal processing device 300 according to Embodiment 2 processes a 3D video signal line-sequentially including a left-eye image and a right-eye image. In order to process the 3D video signal as well as to process a 2D video signal, the synchronous signal generating unit 380 generates a horizontal synchronous signal (hreset2) for image processing, such as superimposition, and a horizontal synchronous signal (hreset1) for providing video.

The horizontal synchronous signal (hreset2) for superimposition indicates either a separation for a line of the left-eye image or a separation for a line of the right-eye image. In other words, the image processing unit 310 receiving the horizontal synchronous signal (hreset2) for superimposition can process the left-eye image and the right-eye image as a one-frame image; that is, a 2D image.

A conventional video signal processing device which provides 2D videos includes, for example, two OSD control units each including a register holding parameters for generating superimposition images and an OSD processing unit generating the superimposition images based on the parameters. Thus, the video signal processing device according to Embodiment 2 may use the two conventional OSD control units as the first OSD control unit 350a and the second OSD control unit 350b.

Thanks to the above structure, the video signal processing device 300 according to Embodiment 3 can be provided without a significant change in circuit structure of the conventional video signal processing device. This feature contributes to reducing the cost increase of the video signal processing device 300 and to processing 3D video signals.

It is noted that the main-screen processing unit 320 and the sub-screen processing unit 330 included in the video signal processing device 300 according to Embodiment 2 are respectively diverted from the main-screen processing unit and the sub-screen processing unit of the conventional video signal processing device. The main-screen processing unit and the sub-screen processing unit are used for generating, for example, PinP images. In this regard, the video signal processing device 300 according to Embodiment 2 contributes to reducing the cost increase.

Figure 12:
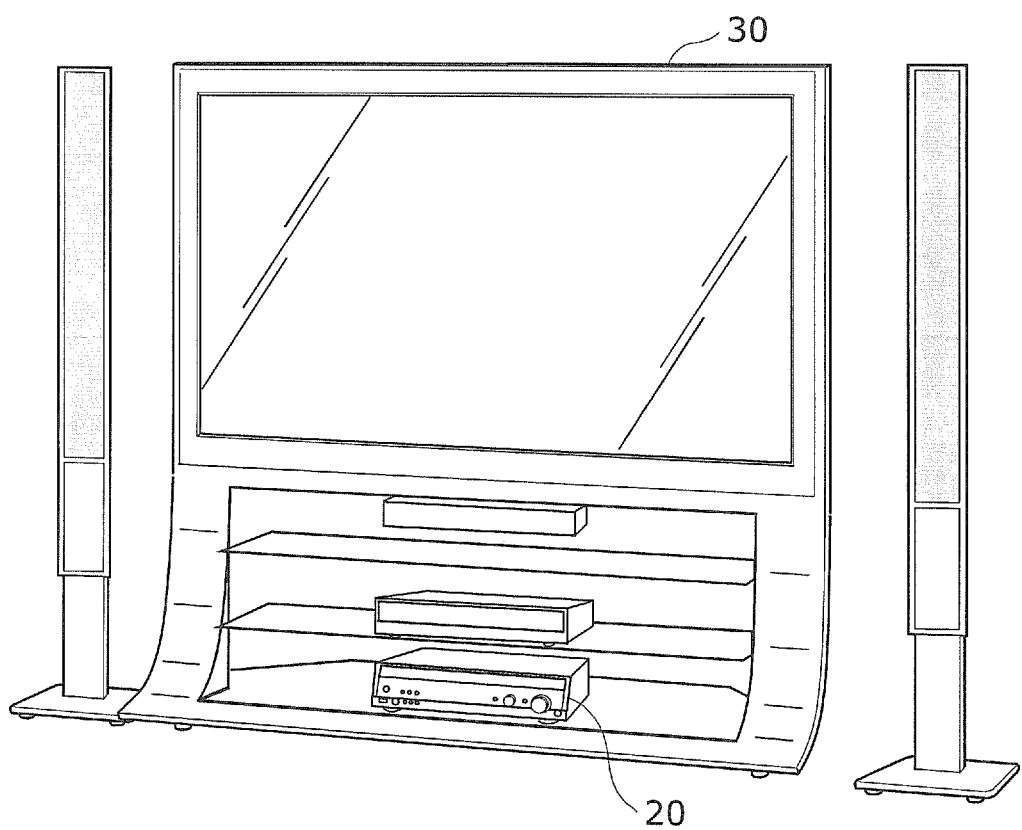
FIG. 12 shows an external view of a digital video recorder and a digital TV including a video signal processing device according to an implementation of the present invention.

It is noted that the video signal processing device 100 according to the present invention may be included in the digital video recorder 20 and the digital TV 30 shown in FIG. 12.

Although only some exemplary embodiments of the video signal processing devices and the video signal processing method in the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

For example, the embodiments are implemented based on full hi-vision images (1920×1080); instead, the embodiments may be implemented based on the VGA (640×480) and hi-vision images (1280×720). Moreover, operation frequency, frame rate, and scanning technique shall not be defined by the above example.

Each of the above units is, specifically, a computer system including a microprocessor, ROM, RAM, a hard disk unit, a display unit, a keyboard, and a mouse. The RAM or the hard disk unit stores a computer program. The devices achieve their functions through the microprocessor's operation according to the computer program. Here, the computer program is configured by combining instruction codes indicating instructions for the computer.

Part or all of the constituent elements constituting each of the devices may be configured from a single System-LSI. The System-LSI is a super-mufti-function LSI manufactured by integrating constituent units on one chip, and is specifically a computer system configured by including a microprocessor, ROM, RAM, or by means of a similar device. The RAM stores a computer program. The System-LSI performs its functions through the microprocessor's operation according to the computer program.

Part or all of the constituent elements constituting each of the devices may be configured as an IC card which can be attached and detached from each device or as a stand-alone module. The IC card or the module is a computer system configured from a microprocessor, ROM, and RAM. The IC card or the module may also be included in the aforementioned super-mufti-function LSI. The IC card or the module achieves its function through the microprocessor's operation according to the computer program. The IC card or the module may also be implemented to be tamper-resistant.

The present invention may be the above-described method. The present invention may be a computer program for realizing the above method, using a computer, and may also be a digital signal including the computer program.

Furthermore, the present invention may also be implemented by storing the computer program or the digital signal in a computer readable recording medium such as a flexible disc, a hard disk, a CD-ROM, a Magneto-optic disc (MO), a Digital Versatile Disc (DVD), a DVD-ROM, a DVD-RAM, a BD (Blu-ray Disc), and semiconductor memory. Furthermore, the present invention also includes the digital signal recorded in these recording media.

Furthermore, the present invention may also be implemented by the transmission of the aforementioned computer program or digital signal via a telecommunication line, a wireless or wired communication line, a network represented by the Internet, and data broadcast.

The present invention may also be a computer system including a microprocessor and memory, in which the memory stores the aforementioned computer program and the microprocessor operates according to the computer program.

Furthermore, by transferring the program or the digital signal by recording onto the aforementioned recording media, or by transferring the program or digital signal via the aforementioned network, execution using another independent computer system is also made possible.

INDUSTRIAL APPLICABILITY

A video signal processing device and a video signal processing method according to the present invention utilize a circuit of a conventional video signal processing device as much as possible to reduce a cost increase. The device and the method may be used for, for example, a digital TV and a digital video recorder.

What is claimed is:

1. A video signal processing device which processes a three-dimensional (3D) video signal including a left-eye image and a right-eye image using a frame-sequential technique, said video signal processing device comprising:
   an on-screen display (OSD) control unit configured to generate a left-eye superimposition image and a right-eye superimposition image;
   a superimposing unit configured to superimpose the left-eye superimposition image on the left-eye image and the right-eye superimposition image on the right-eye image, so as to generate an output image; and
   a video output unit configured to provide the output image, wherein said OSD control unit includes:
   a first register which holds a left-eye parameter for generating the left-eye superimposition image;
   a second register which holds a right-eye parameter for generating the right-eye superimposition image; and
   an OSD processing unit configured to sequentially generate the left-eye superimposition image and the right-eye superimposition image, by switching between said first register and said second register, and
   wherein said OSD control unit is configured to generate the left-eye superimposition image and the right-eye superimposition image, by shifting positions of pixels in a predetermined image based on the left-eye parameter and the right-eye parameter.

2. The video signal processing device according to claim 1, further comprising
   a synchronous signal generating unit configured to generate a synchronous signal indicating a separation between pictures each including the left-eye image and the right-eye image,
   wherein by switching between said first register and said second register based on the synchronous signal, said OSD processing unit is configured to (i) obtain the left-eye parameter from said first register so that the synchronous signal and the left-eye image synchronize with each other, and generate the left-eye superimposition image based on the obtained left-eye parameter and (ii) obtain the right-eye parameter from said second register so that the synchronous signal and the right-eye image synchronize with each other, and generate the right-eye superimposition image based on the obtained right-eye parameter.

3. A video signal processing device which processes a three-dimensional (3D) video signal including a left-eye image and a right-eye image using a line-sequential technique, said video signal processing device comprising:
   an on-screen display (OSD) control unit configured to generate a left-eye superimposition image and a right-eye superimposition image;
   a superimposing unit configured to superimpose the left-eye superimposition image on the left-eye image and the right-eye superimposition image on the right-eye image, so as to generate an output image;
   a synchronous signal generating unit configured to generate (i) a first synchronous signal indicating both a separation for a line of the left-eye image and a separation for a line of the right-eye image and (ii) a second synchronous signal indicating either a separation for a line of the left-eye image or a separation for a line of the right-eye image;
   a synthesizing unit configured to synthesize the left-eye image and the right-eye image based on the second synchronous signal so as to generate a synthesized image; and
   a video output unit configured to provide the output image, wherein said OSD control unit includes:
   a first register which holds a left-eye parameter for generating the left-eye superimposition image;
   a second register which holds a right-eye parameter for generating the right-eye superimposition image;
   a first OSD processing unit configured to obtain the left-eye parameter from said first register, and generate the left-eye superimposition image based on the obtained left-eye parameter; and
   a second OSD processing unit configured to obtain the right-eye parameter from said second register, and generate the right-eye superimposition image based on the obtained right-eye parameter,
   wherein said superimposing unit is configured to, based on the second synchronous signal, superimpose the left-eye superimposition image and the right-eye superimposition image on the synthesized image,
   wherein said video output unit is configured to provide the output image based on the first synchronous signal, and
   wherein said OSD control unit is configured to generate the left-eye superimposition image and the right-eye superimposition image, by shifting positions of pixels in a predetermined image based on the left-eye parameter and the right-eye parameter.

4. The video signal processing device according to claim 3, wherein said first OSD processing unit is further configured to (i) generate in a right-eye image area a right-eye transparent image through which an image-to-be superimposed passes and (ii) provide, based on the second synchronous signal, the left-eye superimposition image and the right-eye transparent image as a one-frame image, said second OSD processing unit is further configured to (i) generate in a left-eye image area a left-eye transparent image through which an image-to-be-superimposed passes and (ii) provide, based on the second synchronous signal, the right-eye superimposition image and the left-eye transparent image as a one-frame image, and
   based on the second synchronous signal, said superimposing unit is configured to superimpose on the synthesized image (i) the left-eye superimposition image and the right-eye transparent image and (ii) the right-eye superimposition image and the left-eye transparent image, so as to generate the output image.

5. A video signal processing device which processes a three-dimensional (3D) video signal including a left-eye image and a right-eye image and a two-dimensional (2D) video signal including a 2D image, said video signal processing device comprising:
- an on-screen display (OSD) control unit configured to generate a left-eye superimposition image and a right-eye superimposition image;
- a superimposing unit configured to superimpose the left-eye superimposition image on the left-eye image and the right-eye superimposition image on the right-eye image, so as to generate an output image; and
- a video output unit configured to provide the output image, wherein said OSD control unit includes:
- a first register which holds a left-eye parameter for generating the left-eye superimposition image; and
- a second register which holds a right-eye parameter for generating the right-eye superimposition image,
- wherein said OSD control unit is configured to generate the left-eye superimposition image and the right-eye superimposition image, by shifting positions of pixels in a predetermined image based on the left-eye parameter and the right-eye parameter,
- wherein said first register further holds a 2D parameter indicating a position of a predetermined image to be displayed,
- wherein said OSD control unit is further configured to control the position of the predetermined image to be displayed, based on the 2D parameter, so as to generate a 2D superimposition image, and
- wherein said superimposing unit is further configured to superimpose the 2D superimposition image on the 2D image.

* * * * *